United States Patent
Isono et al.

(10) Patent No.: US 9,153,269 B2
(45) Date of Patent: Oct. 6, 2015

(54) METHOD FOR MANUFACTURING GLASS SUBSTRATE FOR MAGNETIC DISK

(75) Inventors: Hideki Isono, Kofu (JP); Hidekazu Tanino, Akishima (JP); Akira Murakami, Akiruno (JP); Takashi Sato, Inagi (JP); Masamune Sato, Kodaira (JP)

(73) Assignee: HOYA CORPORATION, Tokyo (JP)

( * ) Notice: Subject to any disclaimer, the term of this patent is extended or adjusted under 35 U.S.C. 154(b) by 0 days.

(21) Appl. No.: 14/001,735

(22) PCT Filed: May 23, 2012

(86) PCT No.: PCT/JP2012/003362
§ 371 (c)(1),
(2), (4) Date: Nov. 12, 2013

(87) PCT Pub. No.: WO2012/160818
PCT Pub. Date: Nov. 29, 2012

(65) Prior Publication Data
US 2014/0060117 A1    Mar. 6, 2014

(30) Foreign Application Priority Data
May 23, 2011   (JP) .................................. 2011-114460

(51) Int. Cl.
*G11B 5/84*    (2006.01)

(52) U.S. Cl.
CPC .................................... *G11B 5/8404* (2013.01)

(58) Field of Classification Search
CPC ..................................................... G11B 5/8404
USPC .......... 428/846.9, 410; 65/30.13, 30.14, 33.1, 65/33.4, 26, 97, 61, 32.5; 359/819; 360/135; 313/477 R
See application file for complete search history.

(56) References Cited

U.S. PATENT DOCUMENTS

| | | | |
|---|---|---|---|
| 5,536,995 A * | 7/1996 | Sugawara et al. | 313/477 R |
| 8,728,638 B2 * | 5/2014 | Isono et al. | 428/846.9 |
| 8,844,320 B2 * | 9/2014 | Isono et al. | 65/102 |
| 2003/0159467 A1* | 8/2003 | Hirota et al. | 65/32.5 |
| 2004/0194508 A1* | 10/2004 | Nishimoto et al. | 65/33.1 |

(Continued)

FOREIGN PATENT DOCUMENTS

| | | | | |
|---|---|---|---|---|
| JP | 01-133948 | * | 5/1989 | ............. C03B 11/00 |
| JP | 11-255521 | | 9/1999 | |

(Continued)

OTHER PUBLICATIONS

Canon JP 01-133948—English Translation, May 1989.*

(Continued)

*Primary Examiner* — Kevin M. Bernatz
(74) *Attorney, Agent, or Firm* — Global IP Counselors, LLP

(57) ABSTRACT

A method for manufacturing a glass substrate for magnetic disk, the internal strain of which is reduced without performing annealing treatment, is provided. The method includes a forming process of forming a plate-shaped glass blank by pressing a lump of molten glass using a pair of dies, wherein the method includes: a removing process of removing at least a part of a residual stress layer formed on the principal face of the glass blank press-formed in the forming process; and a process of forming a donut-shaped glass substrate by subjecting the glass blank after the removing process to machining.

10 Claims, 9 Drawing Sheets

(56) References Cited

U.S. PATENT DOCUMENTS

| | | | |
|---|---|---|---|
| 2005/0190463 A1* | 9/2005 | Kojima | 359/819 |
| 2009/0252993 A1* | 10/2009 | Kawai et al. | 65/30.13 |
| 2011/0102945 A1* | 5/2011 | Isono et al. | 360/135 |
| 2011/0159321 A1* | 6/2011 | Eda et al. | 65/30.14 |

FOREIGN PATENT DOCUMENTS

| | | | | |
|---|---|---|---|---|
| JP | 2003-128425 A | 5/2003 | | |
| JP | 2005-149668 A | 6/2005 | | |
| JP | 2005-263574 A | 9/2005 | | |
| JP | 2008-226377 A | 9/2008 | | |
| JP | 2008-287779 | 11/2008 | | |
| JP | 2010-257563 | 11/2011 | | |
| WO | 2011-080913 | * | 7/2011 | G11B 5/84 |

OTHER PUBLICATIONS

International Search Report of corresponding International Application No. PCT/JP2012/003362, dated on Aug. 28, 2012.

* cited by examiner

METHOD FOR MANUFACTURING GLASS SUBSTRATE FOR MAGNETIC DISK

CROSS-REFERENCE TO RELATED APPLICATIONS

This U.S. National stage application claims priority under 35 U.S.C. §119(a) to Japanese Patent Application No. 2011-114460, filed in Japan on May 23, 2011, the entire contents of Japanese Patent Application No. 2011-114460 are hereby incorporated herein by reference.

BACKGROUND

1. Field of the Invention

The present invention relates to a method for manufacturing a glass substrate for magnetic disk.

2. Background Information

Recently, a hard disk drive device (HDD) is incorporated in a personal computer or a DVD (Digital Versatile Disc) recording apparatus in order to record data. Particularly, in the hard disk device used in an apparatus such as the notebook personal computer based on portability, a magnetic disk in which a magnetic layer is provided on a glass substrate is used, and magnetic recording information is recorded in or read from a magnetic layer using a magnetic head (DFH (Dynamic Flying Height) head) that is slightly floated on a surface of the magnetic disk surface. A glass substrate is suitably used as the substrate for magnetic disk because the glass substrate hardly plastically deformed as compared to a metallic substrate (aluminum substrate) and the like.

The magnetic head includes, for example, a magnetic resistance effect element, but such a magnetic head may cause a thermal asperity trouble as its specific trouble. The thermal asperity trouble is a trouble in which when a magnetic head passes over a micro-irregularly-shaped surface of a magnetic disk while floating and flying, a magnetic resistance effect element is heated by adiabatic compression or contact of air, causing a read error. Thus, for avoiding the thermal asperity trouble, the glass substrate for magnetic disk is prepared such that surface properties, such as the surface roughness and flatness, of the principal face of the glass substrate are at a satisfactory level.

So far, a vertical direct press method has been known as a method for manufacturing a sheet glass (glass blank) as a base of the glass substrate for magnetic disk. This press method is a method in which a lump of molten glass is fed onto a lower die, and the lump of molten glass (molten glass lump) is press-formed using an upper die (Japanese Patent Laid-open Publication No. 1999-255521)

As a method for manufacturing a glass substrate for magnetic disk, a method is known in which a glass blank prepared by press-forming a molten glass lump is subjected to annealing treatment (Japanese Patent Laid-open Publication No. 2008-287779). The annealing treatment is treatment for releasing an internal strain of a glass blank by holding the glass blank prepared by press forming for a predetermined time period at a predetermined temperature around a strain point. By the annealing treatment, for example, the glass blank can be prevented from being broken by an internal strain when cutting lines (linear scratches or cutting lines) are provided for forming the glass blank into a donut shape. The strain point is a temperature at which the internal strain of glass disappears in several hours, and at which the viscosity of glass is about $10^{14.5}$ dPa·s.

SUMMARY

However, the known vertical direct press method has the problem that the flatness (shape accuracy) of a glass blank prepared is poor. The reason for this is as follows.

In the vertical direct press method, immediately after a molten glass lump is placed on a lower die, only a contact surface with the lower die and a part close to the contact surface, of the molten glass lump, are rapidly cooled to be solidified. Since glass has low heat conductivity, an upper part of the molten glass lump (a part which comes into contact with an upper die) remains at a high temperature while the molten glass lump is in contact with the lower die. Therefore, in the case of the vertical direct press method, there is a gap in timing at which the molten glass lump is cooled to be solidified between the lower side and the upper side of the molten glass lump during a process in which the molten glass lump is formed into a glass blank. As a result, the molten glass lump is warped in a concave way, so that the flatness of the glass blank is increased (deteriorated). The gap in timing cannot be drastically suppressed in light of the press system of the vertical direct press method.

Further, in the vertical direct press method, a mold release material ((mold) release agent) such as, for example, BN (boron nitride) should be attached to the die beforehand in order to prevent a situation in which the molten glass lump is stuck to the lower die and cannot be removed, but when such a mold release agent remains attached on the glass blank, the surface roughness cannot be decreased. Preferably the temperatures of the upper die and the lower die are made identical wherever possible for preparing a glass blank having a good flatness, but when the mold release material is attached on the lower die, the heat conductivity of the lower die is deteriorated, and therefore it is difficult to uniformly cool both surfaces of the glass blank in a press forming process. Therefore, the glass blank prepared by the vertical direct press method absolutely requires polishing or grinding and so on in subsequent processes in order to improve the flatness and remove the mold release material sticking to the surface of the glass blank.

For performing the annealing treatment efficiently, a large-scale annealing treatment apparatus is required. Further, when the annealing treatment is performed, it may be required that a state in which the temperature of the glass blank is set to be near a strain point and no higher than a glass transition point (Tg) should be maintained for about 3 to 12 hours. About 3 to 12 hours are required for time for processes including a heating process and an annealing process. Accordingly, when a glass substrate for magnetic disk is manufactured by performing the annealing treatment, large-scale equipment and much time are required, so that manufacture costs of the glass substrate for magnetic disk are increased. Therefore, it is preferable not to conduct an annealing process.

Further, when a glass blank with an internal strain generated during press forming is subjected to the annealing treatment, the internal strain of the glass blank is released, but the glass blank is deformed as the internal strain is released, and the flatness is then deteriorated. For example, when a glass blank press-formed so that the flatness is 4 μm or less is subjected to annealing treatment, there is a case in which the flatness of the glass blank after annealing treatment becomes larger than 4 μm if the internal strain remains in the glass blank during press forming. In this case, a grinding process needs to be performed so that the flatness of the glass blank is equal to or less than 4 μm.

Incidentally, in heat assisted magnetic recording (HAMR) for which studies have been conducted in recent years as a magnetic recording technique for increasing storage density of the magnetic disk, a magnetic layer composed of a ferromagnetic alloy having a $L_{10}$ ordered structure is deposited under a high-temperature environment of, for example, about 600° C. and thereby formed on the principal face of a glass substrate. At this time, if the strain point of the material of the glass substrate is a value close to 600° C. and the internal strain remains in the glass blank as a base of the glass substrate, the internal strain of the glass substrate is released under a high-temperature environment, but the flatness of the glass substrate is deteriorated as in the case of the annealing treatment described above. In this case, the flatness of the glass substrate will be changed after the glass substrate is shipped as a product, thus being not preferable. Therefore, if the flatness of the glass substrate is deteriorated so significantly as to fail to satisfy a predetermined specification required for the magnetic disk, the glass substrate will be discarded.

Therefore, the glass substrate for magnetic disk, which is used in HAMR, is preferably one that is manufactured based on a glass blank in which the internal strain does not remain.

An object of the present invention is to provide a method for manufacturing a glass substrate for magnetic disk, the internal strain of which is reduced, without performing annealing treatment.

In view of the above-described problems, the present inventors have intensively conducted studies, and resultantly devised a novel press forming method. That is, in a method for manufacturing a glass blank according to this embodiment, a horizontal direct press method is employed in which a falling molten glass lump is press-formed using a pair of dies (press forming dies) arranged so as to face each other in a direction (horizontal direction) orthogonal to the falling direction of the molten glass lump. In the horizontal direct press method, the molten glass lump is not temporarily retained in contact with only one of a pair of dies until press forming is started with the molten glass lump sandwiched between a pair of dies. That is, in the horizontal direct press method, unlike the conventional direct press method, a difference in temperature, which is generated throughout the molten glass lump, can be reduced by the time when press forming of the molten glass lump is started. Thus, at the time point immediately before press forming is started, the viscosity distribution of the molten glass lump becomes very wide in the vertical direct press method, whereas the viscosity distribution of the molten glass lump is kept even in the horizontal direct press method of this embodiment. That is, in the horizontal direct method, a variation in the viscosity throughout the molten glass lump can be suppressed. Accordingly, in the horizontal direct press method, it is extremely easy to uniformly thinly draw the molten glass lump to be press-formed as compared to the vertical direct press method. Consequently, as compared to the case where a glass blank is prepared using the vertical direct press method, it is extremely easy to drastically suppress deterioration of the flatness when a glass blank is prepared using the horizontal direct press method.

In addition, the present inventors have arrived at the following findings.

As described above, the flatness of a glass blank prepared is improved by using a horizontal direct press method using a pair of dies. Here, even when the horizontal direct press method is used, heat of the molten glass lump is easily exhausted through the die at a surface portion of the molten glass lump which contacts the press forming surface of the die when the molten glass lump is cooled during press forming.

On the other hand, at the central portion of the molten glass lump, heat of the molten glass is easily confined because this portion does not contact the press forming surface of the die. Therefore, there is a difference in temperature between the surface portion and the central portion of the molten glass lump. At this time, shrinkage associated with cooling of the molten glass lump precedes at the surface portion, and therefore a compressive stress layer (hereinafter, referred to as a residual stress layer) having a predetermined thickness is formed on the principal face of the glass blank after press forming. A tensile stress layer having a predetermined thickness is formed in the glass blank as a reaction to the residual stress layer at the surface portion, which has been formed previously. That is, it has become evident that in the press-formed glass blank, an internal strain by a compressive stress (hereinafter, referred to as a residual stress) and a tensile stress appropriate to the residual stress is generated across the thickness direction of the glass blank. It has become apparent that therefore, when the glass blank is subjected to machining using a scriber, a core drill or the like, the glass blank is broken when cut lines or the like formed by machining reach the tensile stress layer in the glass blank.

Accordingly, the present inventors have found that when at least a part of the residual stress layer formed on the principal face of the glass blank is removed, the residual stress in the residual stress layer and the tensile stress in the tensile stress layer can be decreased, so that the internal strain of the glass blank can be reduced.

From the viewpoint described above, the present invention may be a method for manufacturing a glass substrate for magnetic disk, which includes a forming process of forming a plate-shaped glass blank by pressing a lump of molten glass using a pair of dies, wherein the method includes: a removing process of removing at least a part of a residual stress layer formed on a pair of principal faces of the glass blank press-formed in the forming process; and a process of forming a donut-shaped glass substrate by subjecting the glass blank after the removing process to machining.

Preferably, in the removing process of the method for manufacturing a glass substrate for magnetic disk, at least a portion of the residual stress layer formed on the principal faces of the glass blank press-formed in the forming process may be removed so that the maximum residual stress value of the glass blank is less than a value which causes breaks with said machining.

In the removing process of the method for manufacturing a glass substrate for magnetic disk, at least a portion of the residual stress layer formed on the principal faces of the glass blank press-formed in the forming process may be removed so that the maximum residual stress value is equal to or less than 0.4 kgf/mm$^2$.

In the removing process of the method for manufacturing a glass substrate for magnetic disk, at least a part of each of the residual stress layers formed on both sides of a pair of principal faces of the glass blank may be removed.

In the removing process of the method for manufacturing a glass substrate for magnetic disk, the removal amounts for both surfaces in the principal faces are the same.

In the removing process of the method for manufacturing a glass substrate for magnetic disk, the removal amounts per unit time for both surfaces in the principal faces are the same.

In the removing process of the method for manufacturing a glass substrate for magnetic disk, the removal amount for one of the principal faces is equal to or more than 30 μm.

In the forming process of the method for manufacturing a glass substrate for magnetic disk, the falling lump of molten glass may be press-formed using the pair of dies from directions, each direction being orthogonal to the falling direction.

In the forming process of the method for manufacturing a glass substrate for magnetic disk, press forming may be performed so that the temperature of the press forming surface of the pair of dies is substantially identical.

In the method for manufacturing a glass substrate for magnetic disk, the temperature of the pair of dies may be kept lower than the glass transition point (Tg) of the molten glass during a period of time from when the glass blank contacts the pair of dies to the time the glass blank separates from the pair of dies.

In the method for manufacturing a glass substrate for magnetic disk, the machining may be scribing processing.

In the method for manufacturing a glass substrate for magnetic disk, two concentric circles for forming the glass blank into a donut shape may be scribed in the glass blank at the same time in the scribing processing.

DETAILED DESCRIPTION OF EMBODIMENTS

A method for manufacturing a glass substrate for magnetic disk in this embodiment will be described in detail below.

[Glass Substrate for Magnetic Disk]

Figure 1:
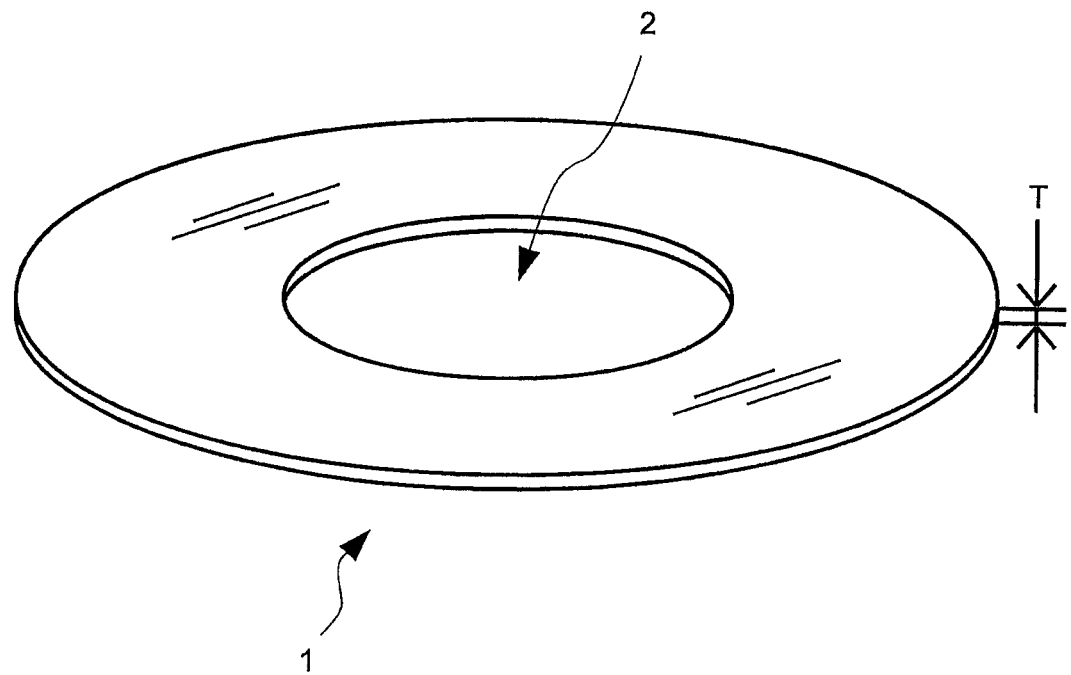
FIG. 1 is a perspective view illustrating an external shape of a glass substrate for magnetic disk of an embodiment.

As illustrated in FIG. 1, a glass substrate for magnetic disk 1 in this embodiment is a donut-shaped thin glass substrate. The size of the glass substrate for magnetic disk is not limited but for example, a glass substrate for magnetic disk having a nominal diameter of 2.5 inches is suitable. In the case of the glass substrate for magnetic disk having a nominal diameter of 2.5 inches, for example, the outer diameter is 65 mm, the diameter of a central hole 2 is 20 mm, and the thickness T is 0.6 to 1.0 mm. The flatness of the principal face of the glass substrate for magnetic disk of the embodiment is, for example, 4 µm or less, and the surface roughness (arithmetic mean roughness Ra) of the principal face is, for example, 0.2 nm or less. It is to be noted that the flatness required for a substrate for magnetic disk as a final product is, for example, 4 µm or less.

Amorphous aluminosilicate glass, soda-lime glass, borosilicate glass or the like can be used as a material of the glass substrate for magnetic disk in this embodiment. Particularly, the amorphous aluminosilicate glass can be suitably used in that chemically strengthening can be performed, and a glass substrate for magnetic disk excellent in flatness of the principal face and strength of the substrate can be prepared. It is preferable if amorphous glass is prepared based on these glass materials because extremely small surface roughness is achieved. In view of the above, it is preferable from the both aspect of strength and reduction in surface roughness if amorphous aluminosilicate glass is prepared.

The composition of the glass substrate for magnetic disk of this embodiment is not limited, but the glass substrate of this embodiment is preferably made of amorphous aluminosilicate glass having a composition including 50 to 75% of $SiO_2$, 1 to 15% of $Al_2O_3$, 5 to 35% in total of at least one component selected from $Li_2O$, $Na_2O$ and $K_2O$, 0 to 20% in total of at least one component selected from MgO, CaO, SrO, BaO and ZnO and 0 to 10% in total of at least one component selected from $ZrO_2$, $TiO_2$, $La_2O_3$, $Y_2O_3$, $Ta_2O_5$, $Nb_2O_5$ and $HfO_2$ in an oxide-based conversion indicated in mol %.

The glass substrate according to the present embodiment may be amorphous aluminosilicate glass having the following composition.

Glass material including, as a glass composition expressed in mol %,
56 to 75% of $SiO_2$,
1 to 11% of $Al_2O_3$,
more than 0% and 4% or less of $Li_2O$,
1% or more and less than 15% of $Na_2O$, and
0% or more and less than 3% of $K_2O$, and is substantially free of BaO;
a total content of alkali metal oxides selected from the group consisting of $Li_2O$, $Na_2O$, and $K_2O$ is in a range of 6 to 15%;
a molar ratio of a content of $Li_2O$ to a content of $Na_2O$ ($Li_2O/Na_2O$) is less than 0.50;
a molar ratio of a content of $K_2O$ to the total content of the alkali metal oxides $\{K_2O/(Li_2O+Na_2O+K_2O)\}$ is 0.13 or less;
a total content of alkaline-earth metal oxides selected from the group consisting of MgO, CaO, and SrO is in a range of 10 to 30%;
a total content of MgO and CaO is in a range of 10 to 30%;
a molar ratio of the total content of MgO and CaO to the total content of the alkaline-earth metal oxides $\{(MgO+CaO)/(MgO+CaO+SrO)\}$ is 0.86 or more;
a total content of the alkali metal oxides and the alkaline-earth metal oxides is in a range of 20 to 40%;
a molar ratio of a total content of MgO, CaO, and $Li_2O$ to the total content of the alkali metal oxides and the alkaline-earth metal oxides $\{(MgO+CaO+Li_2O)/(Li_2O+Na_2O+K_2O+MgO+CaO+SrO)\}$ is 0.50 or more;
a total content of oxides selected from the group consisting of $ZrO_2$, $TiO_2$, $Y_2O_3$, $La_2O_3$, $Gd_2O_3$, $Nb_2O_5$, and $Ta_2O_5$ is more than 0% and 10% or less; and
a molar ratio of the total content of the oxides to a content of $Al_2O_3$ $\{(ZrO_2+TiO_2+Y_2O_3+La_2O_3+Gd_2O_3+Nb_2O_5+Ta_2O_5)/Al_2O_3\}$ is 0.40 or more.

The glass substrate according to the present embodiment may be amorphous aluminosilicate glass having the following composition.

Glass material including, as a glass composition expressed in mol %, 50 to 75% of $SiO_2$, 0 to 5% of $Al_2O_3$, 0 to 3% of $Li_2O$, 0 to 5% of ZnO, 3 to 15% in total of $Na_2O$ and $K_2O$, 14 to 35% in total of MgO, CaO, SrO, and BaO and 2 to 9% in total of $ZrO_2$, $TiO_2$, $La_2O_3$, $Y_2O_3$, $Yb_2O_3$, $Ta_2O_5$, $Nb_2O_5$ and $HfO_2$, a molar ratio [(MgO+CaO)/(MgO+CaO+SrO+BaO)] is in a range of 0.8 to 1, and a molar ratio [$Al_2O_3$/(MgO+CaO)] is in a range of 0 to 0.30.

[Method for Manufacturing Glass Substrate for Magnetic Disk of Embodiment]

Figure 2:
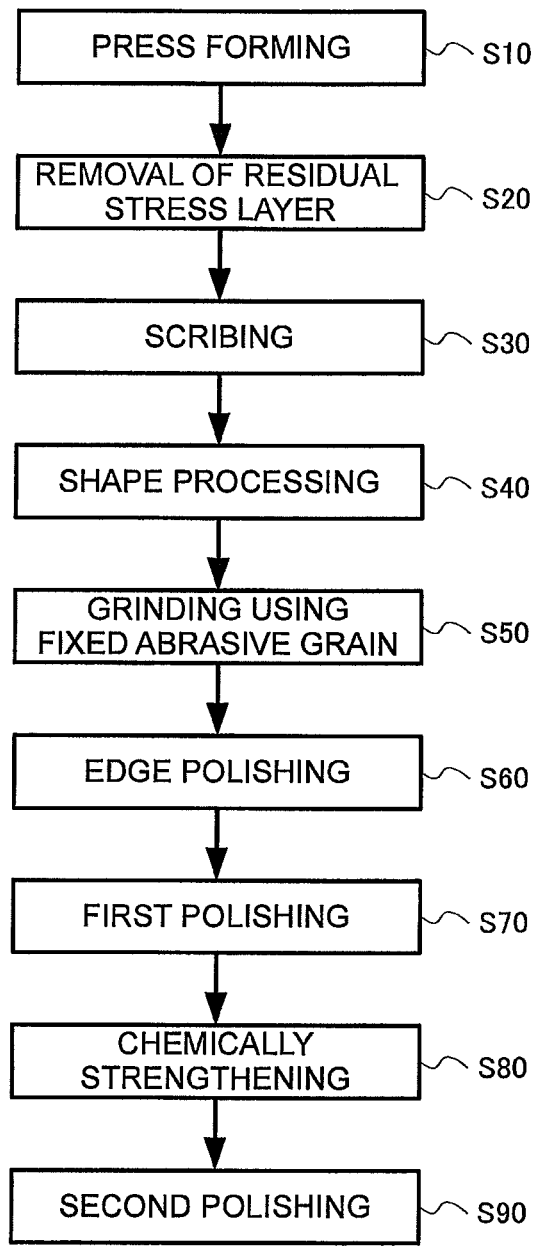
FIG. 2 is a view illustrating a flow of one embodiment of a method for manufacturing the glass substrate for magnetic disk of the embodiment.

Next, a flow of a method for manufacturing a glass substrate for magnetic disk will be described with reference to FIG. 2. FIG. 2 is a view illustrating a flow of one embodiment of a method for manufacturing a glass substrate for magnetic disk.

As illustrated in FIG. 2, in the method for manufacturing a glass substrate for magnetic disk in this embodiment, first a disk-shaped glass blank is prepared by press forming (Step S10). Next, at least a part of the residual stress layer formed on the principal face of the prepared glass blank is removed (Step S20). Next, the glass blank is scribed to prepare a donut-shaped glass substrate (Step S30). Next, the scribed glass substrate is subjected to shape processing (chamfering processing) (Step S40). Next, the glass substrate is subjected to grinding using a fixed abrasive grain (Step S50). Next, edge polishing of the glass substrate is performed (Step S60). Next, the principal face of the glass substrate is subjected to first polishing (Step S70). Next, the glass substrate, after first polishing, is subjected to chemically strengthening (Step S80). Next, the chemically strengthened glass substrate is subjected to second polishing (Step S90). The glass substrate for magnetic disk is obtained through the above processes.

Each process will be described in detail below.

(a) Press Forming Process (Step S10)

Figure 3:
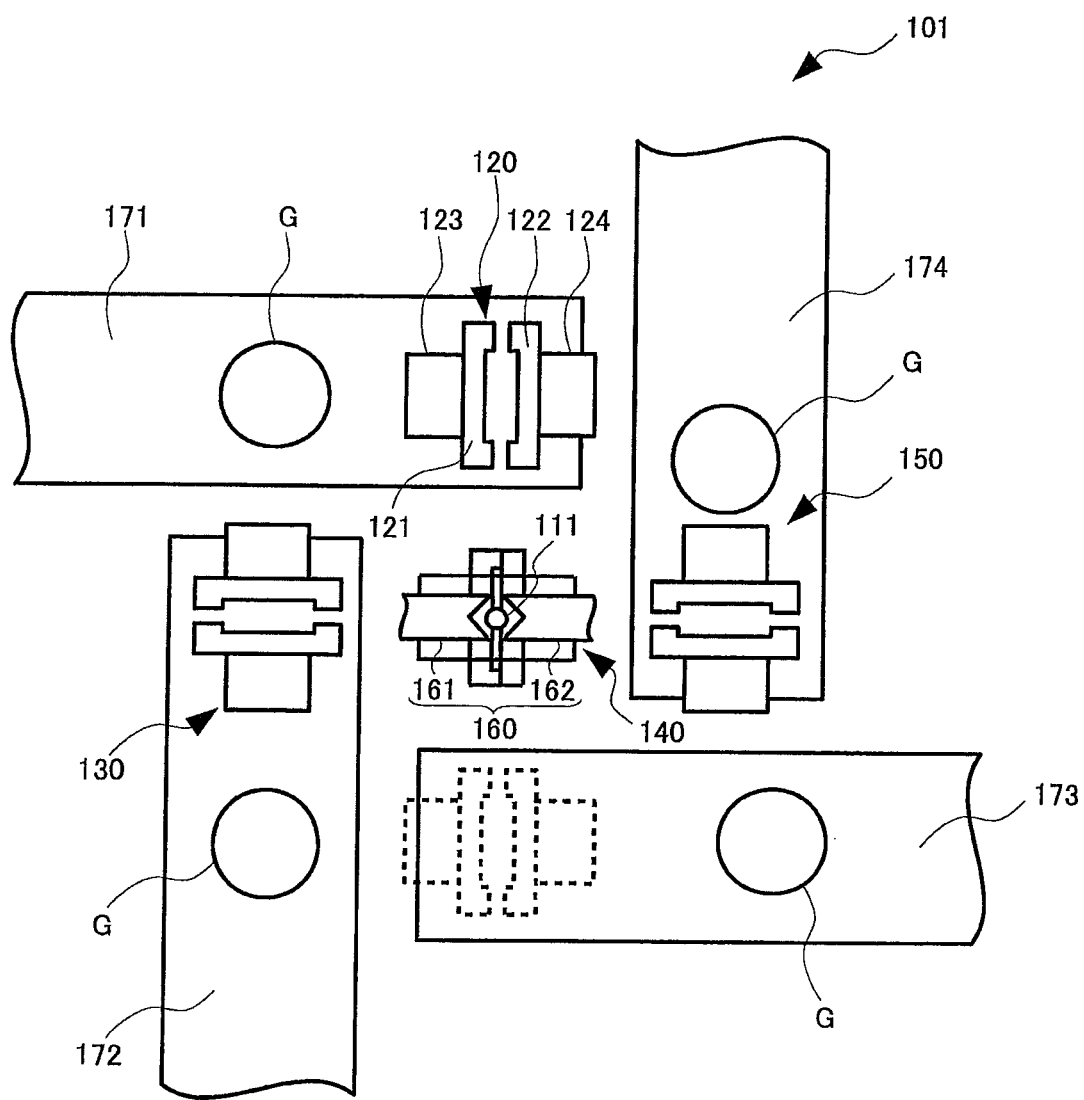
FIG. 3 is a plan view of an apparatus used in press forming of the embodiment.

First, the press forming process will be described with reference to FIG. 3. FIG. 3 is a plan view of an apparatus used in press forming. As illustrated in FIG. 3, an apparatus 101 includes four sets of press units 120, 130, 140 and 150, a cutting unit 160 and a cutting blade 165 (not illustrated in FIG. 2). The cutting unit 160 is provided on a path of a molten glass that flows out from a molten glass outflow port 111. In the apparatus 101, a lump of molten glass (hereinafter, also referred to as a gob) cut by the cutting unit 160 is caused to fall down, and the lump is pressed from both sides of the falling path of the lump while the lump is sandwiched between surfaces of a pair of dies facing each other, thereby forming the glass blank.

Figure 4:
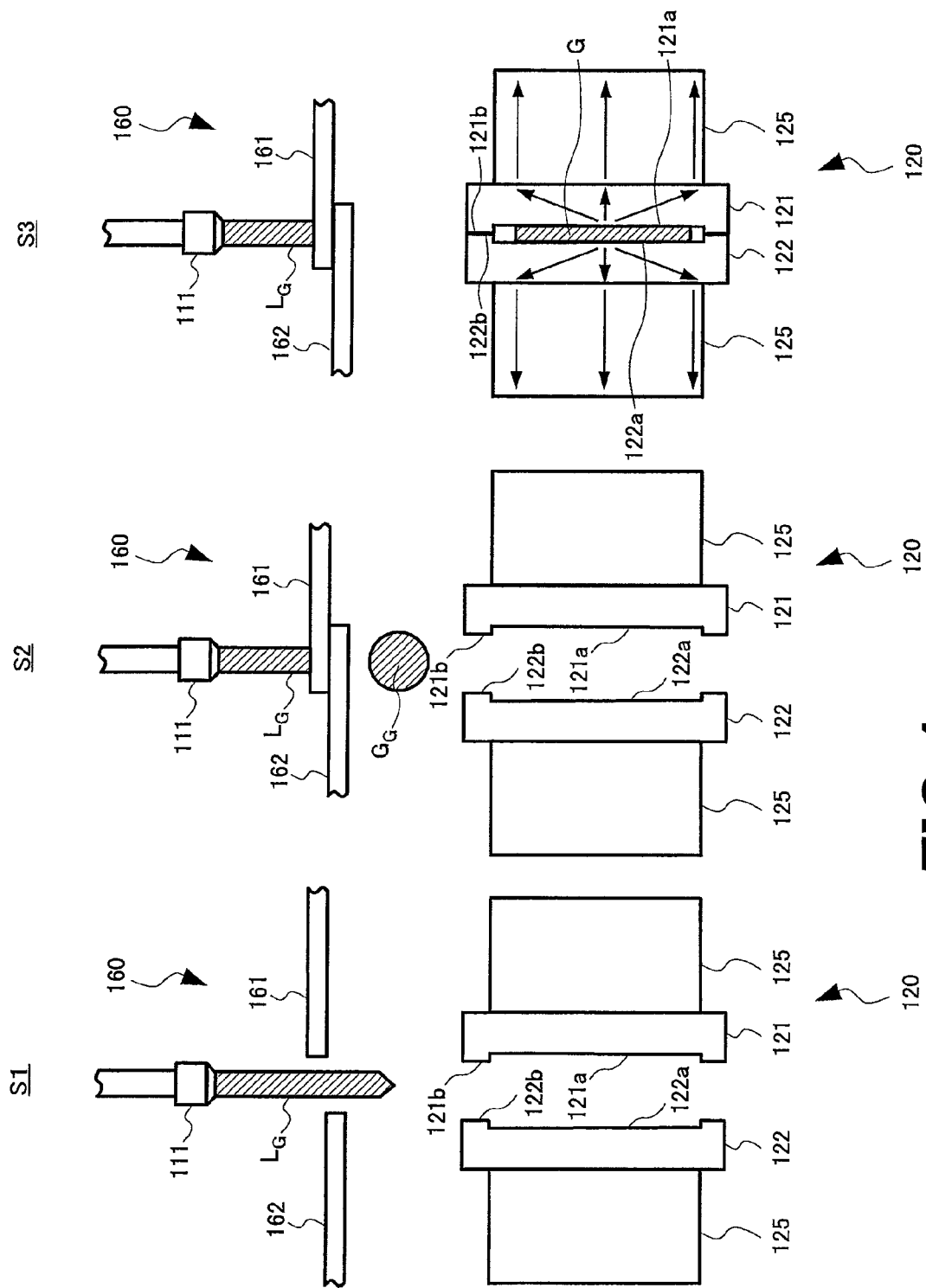
FIG. 4 is a plan view illustrating an arrangement of four sets of press units of an apparatus used in press forming of the embodiment.

Specifically, as illustrated in FIG. 4, in the apparatus 101, the four sets of press units 120, 130, 140, and 150 are provided at intervals of 90 degrees around the molten glass outflow port 111.

Each of the press units 120, 130, 140, and 150 is driven by a moving mechanism (not illustrated) so as to be able to proceed and retreat with respect to the molten glass outflow port 111. That is, each of the press units 120, 130, 140, and 150 can be moved between a catch position and a retreat position. The catch position (position in which the press unit 140 is drawn by a solid line in FIG. 3) is located immediately below the molten glass outflow port 111. The retreat position (positions in which the press units 120, 130, and 150 are drawn by solid lines and a position in which the press unit 140 is drawn by a broken line in FIG. 3) is located away from the molten glass outflow port 111.

The cutting unit 160 is provided on a path of the molten glass between the catch position (position in which the gob is captured by the press unit) and the molten glass outflow port 111. The cutting unit 160 forms the lump of molten glass by cutting a proper quantity of the molten glass flowing out from the molten glass outflow port 111. The cutting unit 160 includes a pair of cutting blades 161 and 162. The cutting blades 161 and 162 are driven so as to intersect each other on the path of the molten glass at constant timing. When the cutting blades 161 and 162 intersect each other, the molten glass is cut to obtain the gob. The obtained gob falls down toward the catch position.

The press unit 120 includes a first die 121, a second die 122, a first driving unit 123, a second driving unit 124 and a temperature controlling unit 125. Each of the first die 121 and the second die 122 is a plate-shaped member including a surface (press forming surface) used to perform the press forming for the gob. The first die 121 and the second die 122 are disposed such that normal directions of the surfaces become substantially horizontal, and such that the surfaces become parallel to each other. It should be noted that each of the first die 121 and the second die 122 is not limited to be plate-shaped so long as each die includes a press forming surface. The first driving unit 123 causes the first die 121 to proceed and retreat with respect to the second die 122. On the other hand, the second driving unit 124 causes the second die 122 to proceed and retreat with respect to the first die 121. Each of the first driving unit 123 and the second driving unit 124 includes a mechanism for causing the surface of the first driving unit 123 and the surface of the second driving unit 124 to be rapidly brought close to each other, for example, a mechanism in which an air cylinder or a solenoid and a coil spring are combined.

The temperature controlling unit 125 causes heat to be conducted easily within the press forming surface of each of first and second dies 121 and 122 during press forming of the gob to reduce a difference in temperature in the press forming surface. The temperature controlling unit 125 is an example of temperature controlling means. The temperature controlling unit 125 is provided so as to contact entire surfaces opposite to the press forming surfaces of first and second dies 121 and 122. Preferably the temperature controlling unit 125 is formed with material having heat conductivity higher than that of each of first and second dies 121 and 122. For example, when first and second dies 121 and 122 are formed of an ultrahard alloy (e.g. VM40), the temperature controlling unit 125 may be formed of copper, a copper alloy, aluminum, an aluminum alloy or the like. Since the temperature controlling unit 125 has heat conductivity higher than that of each of first and second dies 121 and 122, heat from first and second dies 121 and 122 can be efficiently discharged to outside. The heat conductivity of the ultrahard alloy (VM40) is 71 (W/m·K), and the heat conductivity of copper is 400 (W/m·K). The member that forms the temperature controlling unit 125 may be appropriately selected according to the heat conductivity, hardness, thickness and dimension, etc. of the metal forming first and second dies 121 and 122. First and second dies 121 and 122 are required to have strength capable of sustaining press, and therefore preferably they are not integrated with the temperature controlling unit 125.

A heat wasting mechanism including a passage of liquid or air, etc. having cooling effect, and/or, a heating mechanism such as heater, etc. may be prepared as a temperature controlling means for reducing the difference in temperature in the inner circumferential surface (inner surface of the cylindrically-shaped die).

Because the structures of the press units 130, 140, and 150 are similar to that of the press unit 120, the descriptions of the press units 130, 140, and 150 are omitted.

After each press unit moves to the catch position, the falling gob is sandwiched between the first die and the second die by driving the first driving unit and the second driving unit, and the gob is formed into a predetermined thickness while rapidly cooled, thereby preparing a circular glass blank G. Load applied (pressing pressure) may be preferably in the range of 2,000 to 15,000 kgf. Being accelerated sufficiently within the range, press units enables short time pressing. Then, the gob may be formed into thickness suitable for a glass blank for a magnetic disk irrespective of glass material. Next, after the press unit moves to the retreat position, the first die and the second die are separated to cause the formed glass blank G to fall down. A first conveyer 171, a second conveyer 172, a third conveyer 173, and a fourth conveyer 174 are provided below the retreat positions of the press units 120, 130, 140, and 150, respectively. Each of the first to fourth conveyers 171 to 174 receive the glass blank G falling down from the corresponding press unit, and the conveyer conveys the glass blank G to an apparatus (not illustrated) of the next process.

The apparatus 101 is configured such that the press units 120, 130, 140, and 150 sequentially move to the catch position and move to the retreat position while the gob is sandwiched, so that the glass blank G can continuously be formed without waiting for the cooling of the glass blank G in each press unit.

S1 to S3 of FIG. 4 more specifically illustrates press forming performed by the apparatus 101. S1 of FIG. 4 is a view illustrating the state before the gob is made. S2 of FIG. 4 is a view illustrating the state in which the gob is made by the cutting unit 160. S3 of FIG. 4 is a view illustrating the state in which the glass blank G is formed by pressing the gob.

As illustrated in S1 of FIG. 4, a molten glass material $L_G$ continuously flows out from the molten glass outflow port 111. At this point, the cutting unit 160 is driven at predetermined timing to cut the molten glass material $L_G$ using the cutting blades 161 and 162 (S2 of FIG. 4). Therefore, the cut molten glass becomes a substantially spherical gob $G_G$ due to a surface tension thereof. Adjustment of the outflow quantity per time of the molten glass material $L_G$ and the driving interval of the cutting unit 160 may be appropriately performed according to a volume determined by the target size and thickness of the glass blank G.

The made gob $G_G$ falls down toward a gap between the first die 121 and second die 122 of the press unit 120. At this point, the first driving unit 123 and the second driving unit 124 (see FIG. 4) are driven such that the first die 121 and the second die 122 come close to each other at the timing the gob $G_G$ enters the gap between the first die 121 and the second die 122. Therefore, as illustrated in S3 of FIG. 4, the gob $G_G$ is captured (caught) between the first die 121 and the second die 122. An inner circumferential surface 121a (press forming surface) of the first die 121 and an inner circumferential surface 122a (press forming surface) of the second die 122 come close to each other with a micro gap, and the gob $G_G$ sandwiched between the inner circumferential surface 121a of the first die 121 and the inner circumferential surface 122a of the second die 122 is formed into a thin-plate shape. A projection 121b and a projection 122b are provided in the first inner circumferential surface 121a of the first die 121 and the second inner circumferential surface 122a of the second die 122, respectively, in order to keep the gap between the inner circumferential surface 121a of the first die 121 and the inner circumferential surface 122a of the second die 122 constant. That is, the projection 121b and the projection 122b abut against each other, whereby the gap between the inner circumferential surface 121a of the first die 121 and the inner circumferential surface 122a of the second die 122 is kept constant, so that a plate-shaped space is generated.

Press forming is performed using a pair of dies 121 and 122 in the press forming process in press forming in this embodiment, and the outer shape of the glass blank is not restricted by the shape of the die. That is, as illustrated in S3 of FIG. 4, the gob stretched by closed dies does not reach projections 121b and 122b.

As illustrated in S3 of FIG. 4, heat transferred to central portions of inner circumferential surfaces 121a and 122a from the gob $G_G$ is discharged to outside through the cooling control unit 125 in accordance with a flow of heat illustrated by the arrow in the figure.

A temperature control mechanism (not illustrated) is provided in each of the first die 121 and second die 122, and temperatures at the first die 121 and second die 122 is retained sufficiently lower than the glass transition point $T_G$ of the molten glass $L_G$. The temperature control mechanism may be configured as a temperature controlling means.

It is not necessary to attach a mold release material to the first die 121 and the second die 122 in the press forming process.

The flatness of the glass blank obtained after press forming becomes better as a difference in temperature between the central portion and the circumferential edge portion of the inner circumferential surface 121a of the first die 121, and a difference in temperature between the central portion and the circumferential edge portion of the inner circumferential surface 122a of the second die 122 (that is, a difference in temperature of the press forming surface) decreases at the time of press-forming the gob $G_G$. Particularly, it is preferable to decrease the difference in temperature by efficiently discharging heat from the gob $G_G$, which is easily confined in the central portion of each of inner circumferential surfaces 121a and 122a, to outside. This is because when a difference in temperature of the press forming surface during press forming is decreased, the temperature of the central portion and the temperature of the circumferential edge portion of the inner circumferential surface are almost identical, so that the central portion and the circumferential edge portion of the gob $G_G$ can be solidified almost at the same time.

Since the temperature of the central portion and the temperature of the circumferential edge portion of the inner circumferential surface are almost identical, an internal strain (in-plane strain) by a residual stress directing from the circumferential edge portion to the central portion of the press forming surface can be prevented from being generated in the press-formed glass blank. Resultantly, surface waviness of the glass blank obtained after the press forming becomes excellent.

Thus, by reducing a difference in temperature of the press forming surface during pressing of the glass blank using the temperature controlling unit 125, flatness required for the glass substrate for magnetic disk can be achieved, and the central portion and the circumferential edge portion of the gob $G_G$ can be solidified at the same time. For example, if the flatness required for the glass substrate for magnetic disk is 4 μm, press forming is performed while the difference in temperature between the central portion and the circumferential edge portion of the inner circumferential surface is kept at 10° C. or less. Generation of the in-plane strain of the glass blank is best prevented when a difference in temperature between the central portion and the circumferential edge portion is 0° C. The difference in temperature may be appropriately determined according to the size of the glass blank G formed, the composition of the glass, and so on.

Next, a difference in temperature between the first die 121 and the second die 122 may be determined from the following viewpoint according to flatness required for the glass substrate for magnetic disk.

Since glass substrate for magnetic disk of this embodiment is incorporated while being pivotally supported by a metallic spindle having a high thermal expansion coefficient within a hard disk as a magnetic disk that is a final product, the thermal expansion coefficient of the glass substrate for magnetic disk is preferably as high as that of the spindle. Therefore, the composition of the glass substrate for magnetic disk is defined so that the glass substrate for magnetic disk has a high thermal coefficient. The thermal expansion coefficient of the glass substrate for magnetic disk is, for example, in a range of $30 \times 10^{-7}$ to $100 \times 10^{-7} (K^{-1})$, preferably in a range of $50 \times 10^{-7}$ to $100 \times 10^{-7} (K^{-1})$, ever more preferably equal to or more than $80 \times 10^{-7} (K^{-1})$. The thermal expansion coefficient is a value calculated using the linear expansion coefficients of the glass substrate for magnetic disk at temperatures of 100° C. and 300° C. A thermal expansion coefficient of, for example, less than $30 \times 10^{-7} (K^{-1})$ or more than $100 \times 10^{-7}$ is not preferable because a difference in thermal expansion coefficient between the glass substrate and the spindle is increased. From the point of view, temperature conditions at the circumference of the principal face of the glass blank are made uniform in the press forming process when a glass substrate for magnetic disk having a high thermal expansion coefficient is prepared. As one example, it is preferable to perform temperature control so that the temperatures of the inner circumferential surface 121a of the first die 121 and the inner circumferential surface 122a of the second die 122 become substantially identical. When temperature control is performed so that the temperatures become identical, for example, a difference in temperature is preferably 5° C. or less. The difference in temperature is more preferably 3° C. or less, especially preferably 1° C. or less.

The difference in temperature between dies is a difference in temperature as measured using a thermocouple at a point which is located 1 mm from each of the front faces of the inner circumferential surface 121a of the first die 121 and the inner circumferential surface 122a of the second die 122 to the inside of the die and at which the inner circumferential surface 121a and the inner circumferential surface 122a face each other (e.g. a point corresponding to the central position of the glass blank and central points of the inner circumferential surface 121a and the inner circumferential surface 122a). The difference in temperature between the dies is measured when the gob contacts the first die 121 and the second die 122.

A time until the gob $G_G$ is completely confined between the first die 121 and the second die 122 after the gob $G_G$ comes into contact with the inner circumferential surface 121a of the first die 121 or the inner circumferential surface 122a of the second die 122, is shorter than 0.1 second (approximately 0.06 second) in the apparatus 101. Therefore, the gob $G_G$ is formed into the substantially disk shape by spreading along the inner circumferential surface 121a of the first die 121 and the inner circumferential surface 122a of the second die 122 within an extremely short time, and the gob $G_G$ is cooled and solidified in the form of amorphous glass. In this way, the glass blank G is prepared. The size of the glass blank G formed in this embodiment is, depending on the size of a desired glass substrate for magnetic disk, for example about 20 to 200 mm in diameter.

In the press forming method of this embodiment, the glass blank G is formed in a manner such that the inner circumferential surface 121a of the first die 121 and the inner circumferential surface 122a of the second die 122 are duplicated, and therefore preferably the flatness and the smoothness of each of the inner circumferential surfaces of a pair of dies are made comparable to those of a desired glass substrate for magnetic disk. In this case, necessity to subject the glass blank G to a surface processing process, i.e. a grinding and polishing process after press forming may be eliminated. That is, the thickness of the glass blank G formed in the press forming method of this embodiment may be the sum of the target thickness of the glass substrate for magnetic disk that is finally obtained and the thickness of the residual stress layer that is removed in the removing process described later. For example, the glass blank G is preferably a disk-shaped sheet having a thickness of 0.2 to 1.1 mm. The surface roughness of each of the inner circumferential surface 121a and the inner circumferential surface 122a are substantially uniform in the whole surfaces, and are adjusted so that the arithmetic mean roughness Ra of the glass blank G is preferably 0.0005 to 0.05 µm, more preferably 0.001 to 0.1 µm. The surface roughness of the glass blank G is duplicated from surface properties of the inner circumferential surface 121a and the inner circumferential surface 122a, and is therefore uniform in the whole surfaces.

After the first die 121 and the second die 122 are closed, the press unit 120 quickly moves to the retreat position, instead the press unit 130 moves to the catch position, and the press unit 130 performs the pressing to the gob $G_G$.

After the press unit 120 moves to the retreat position, the first die 121 and the second die 122 are kept closed until the glass blank G is sufficiently cooled (at least until the glass blank G has a temperature below a yield point). Then, the first driving unit 123 and the second driving unit 124 are driven to separate the first die 121 and the second die 122, the glass blank G falls down from the press unit 120, and the conveyer 171 located below the press unit 120 receives the glass blank G (see FIG. 3).

As described above, in the apparatus 101, the first die 121 and the second die 122 are closed within a time as extremely short as 0.1 second (about 0.06 second), and the molten glass substantially simultaneously comes into contact with the whole of the inner circumferential surface 121a of the first die 121 and the whole of the inner circumferential surface 122a of the second die 122. Therefore, the inner circumferential surface 121a of the first die 121 and the inner circumferential surface 122a of the second die 122 are not locally heated, and a strain is hardly generated in the inner circumferential surface 121a and the inner circumferential surface 122a. Because the molten glass is formed into the disk shape before the heat transfers from the molten glass to the first die 121 and the second die 122, a temperature distribution of the formed molten glass becomes substantially even. Therefore, in cooling the molten glass, variation of the shrinkage quantity of the glass material is small, and the large strain is not generated in the principal face of the glass blank G. Accordingly, the flatness of the principal face of the prepared glass blank G is improved as compared to a glass blank prepared by conventional press forming with an upper die and a lower die.

In the example illustrated in FIG. 4, the substantially spherical gob $G_G$ is formed by cutting the flowing-out molten glass $L_G$ using the cutting blades 161 and 162. However, when viscosity of the molten glass material $L_G$ is small with respect to a volume of the gob $G_G$ to be cut, the glass does not become the substantially spherical shape only by cutting the molten glass $L_G$, and the gob is not formed. In such cases, a gob forming die is used to form the gob.

Figure 5:
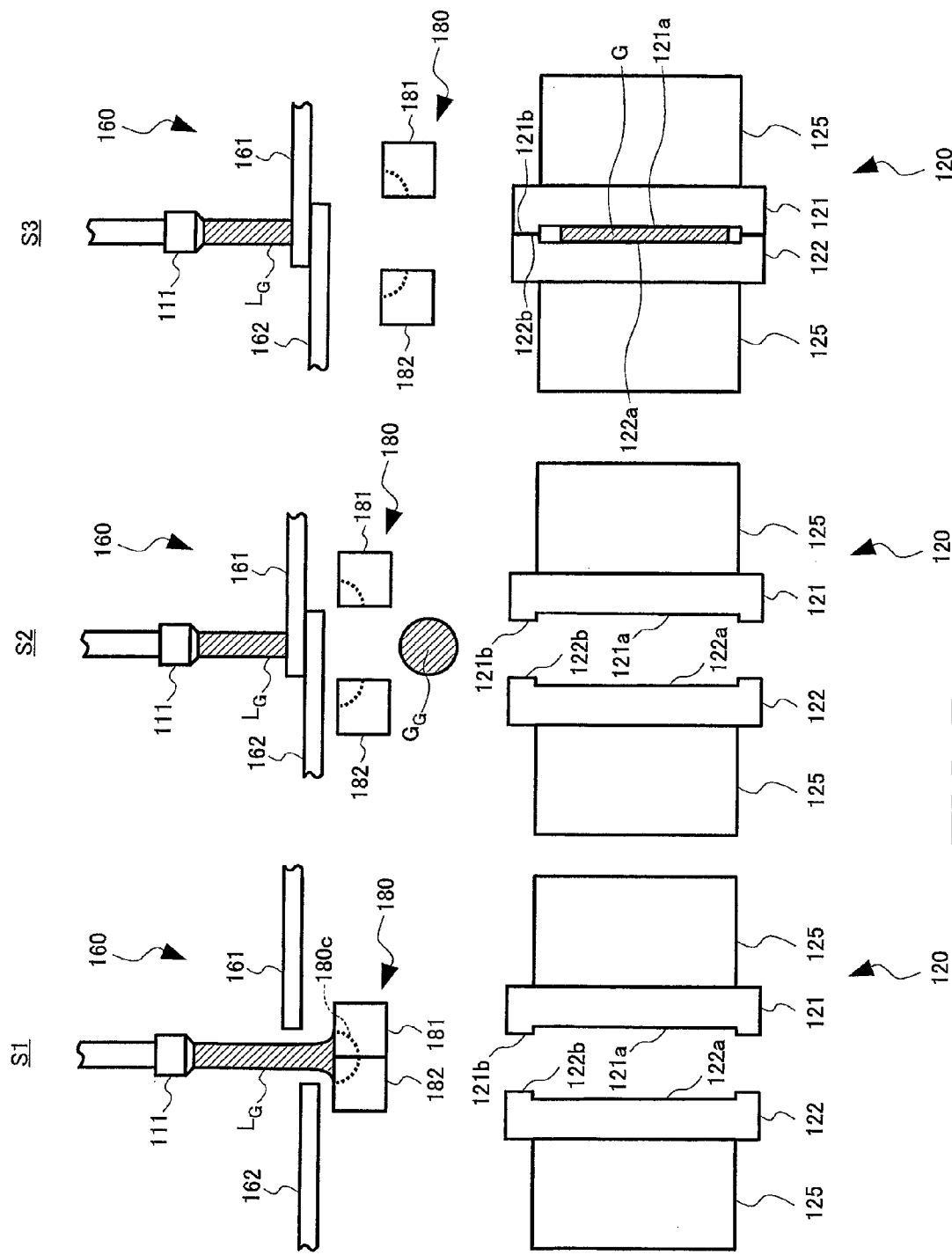
FIG. 5 is a view illustrating a modification of press forming of the embodiment using a gob forming die.

S1 to S3 of FIG. 5 are views illustrating a modification of the embodiment of FIG. 4. The gob forming die is used in the modification. S1 of FIG. 5 is a view illustrating the state before the gob is made. S2 of FIG. 5 is a view illustrating the state in which the gob $G_G$ is made by the cutting unit 160 and a gob forming die 180. S3 of FIG. 5 is a view illustrating the state in which the press forming is performed to the gob $G_G$ to make the glass blank G.

As illustrated in S1 of FIG. 5, the path of the molten glass $L_G$ to the press unit 120 is closed by closing the blocks 181 and 182, and the lump of the molten glass $L_G$ cut with the cutting unit 160 is received by a recess 180C formed by the blocks 181 and 182. Then, as illustrated in S2 of FIG. 5, the molten glass $L_G$ that becomes the spherical shape in the recess 180C falls down toward the press unit 120 at one time by opening the blocks 181 and 182. When falling down toward the press unit 120, the gob $G_G$ becomes the spherical shape by the surface tension of the molten glass $L_G$. As illustrated in S3 of FIG. 5, during the fall of the gob $G_G$, the spherical gob $G_G$ is sandwiched between the first die 121 and the second die 122 to perform the press forming, thereby preparing the disk-shaped glass blank G.

Figure 6:
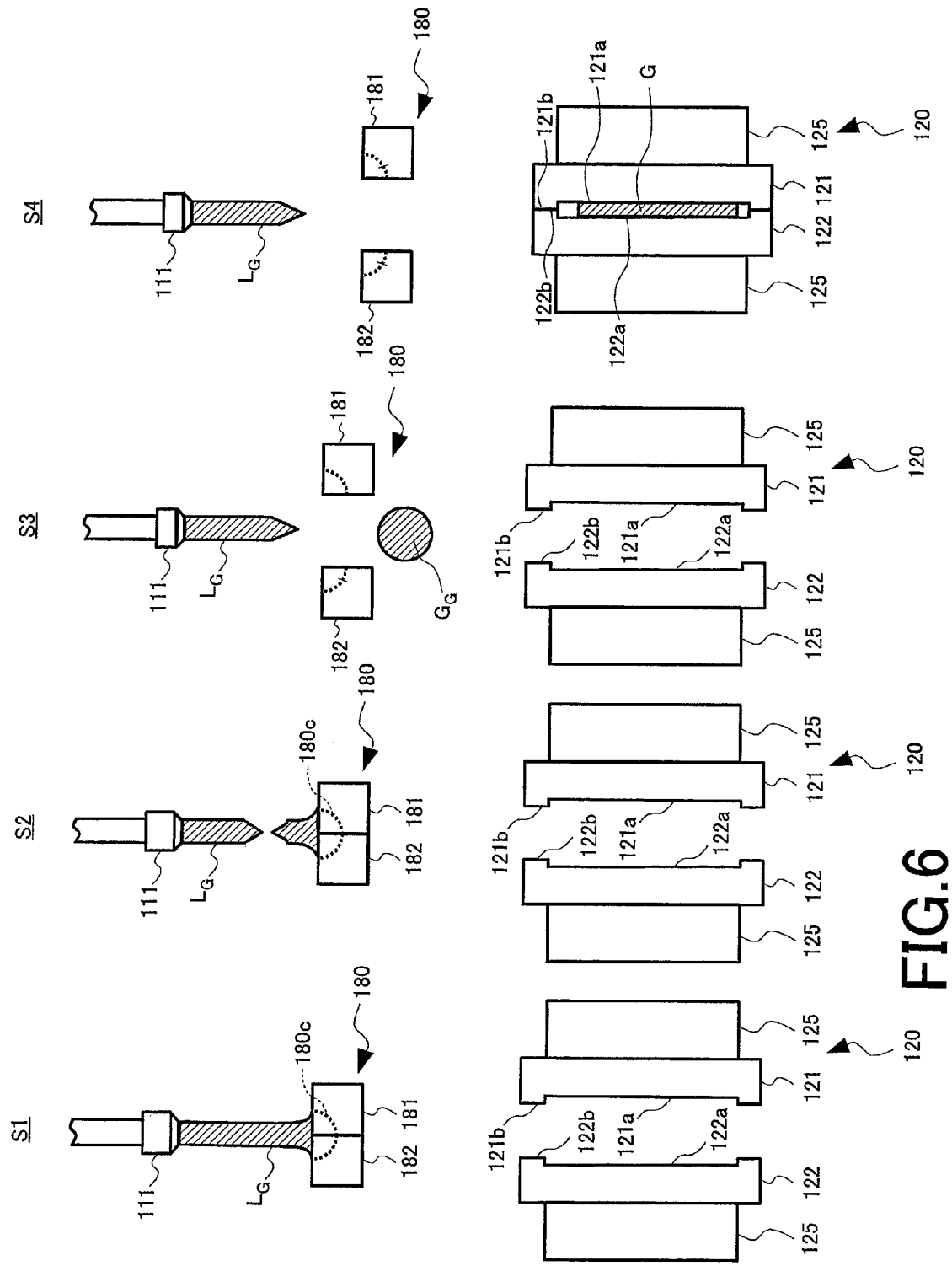
FIG. 6 is a view illustrating a modification of press forming of the embodiment in which a cutting unit is not used.

Alternatively, as illustrated in S1 to S4 of FIG. 6, in the apparatus 101, instead of using the cutting unit 160 illustrated in S1 to S3 of FIG. 5, a moving mechanism that moves the gob forming die 180 in an upstream direction or a downstream direction along the path of the molten glass $L_G$ may be used. S1 to S4 of FIG. 6 are views illustrating a modification in which the gob forming die 180 is used. S1 and S2 of FIG. 6 are views illustrating the state before the gob $G_G$ is made. S3 of FIG. 6 is a view illustrating the state in which the gob $G_G$ is made by the gob forming die 180. S4 of FIG. 6 is a view illustrating the state in which the gob $G_G$ is subjected to press forming to make the glass blank G.

As illustrated in S1 of FIG. 6, the recess 180C formed by the blocks 181 and 182 receives the molten glass $L_G$ flowing out from the molten glass outflow port 111. As illustrated in S2 of FIG. 6, the blocks 181 and 182 are quickly moved onto the downstream side of the flow of the molten glass $L_G$ at predetermined timing. In this way, the molten glass $L_G$ is cut. Then, as illustrated in S3 of FIG. 6, the blocks 181 and 182 are separated at predetermined timing. Therefore, the molten glass $L_G$ retained by the blocks 181 and 182 falls down at one time, and the gob $G_G$ becomes the spherical shape by the surface tension of the molten glass $L_G$. As illustrated in S4 of FIG. 6, during the fall of the gob $G_G$, the spherical gob $G_G$ is sandwiched between the first die 121 and the second die 122 to perform the press forming, thereby preparing the disk-shaped glass blank G.

Figure 7:
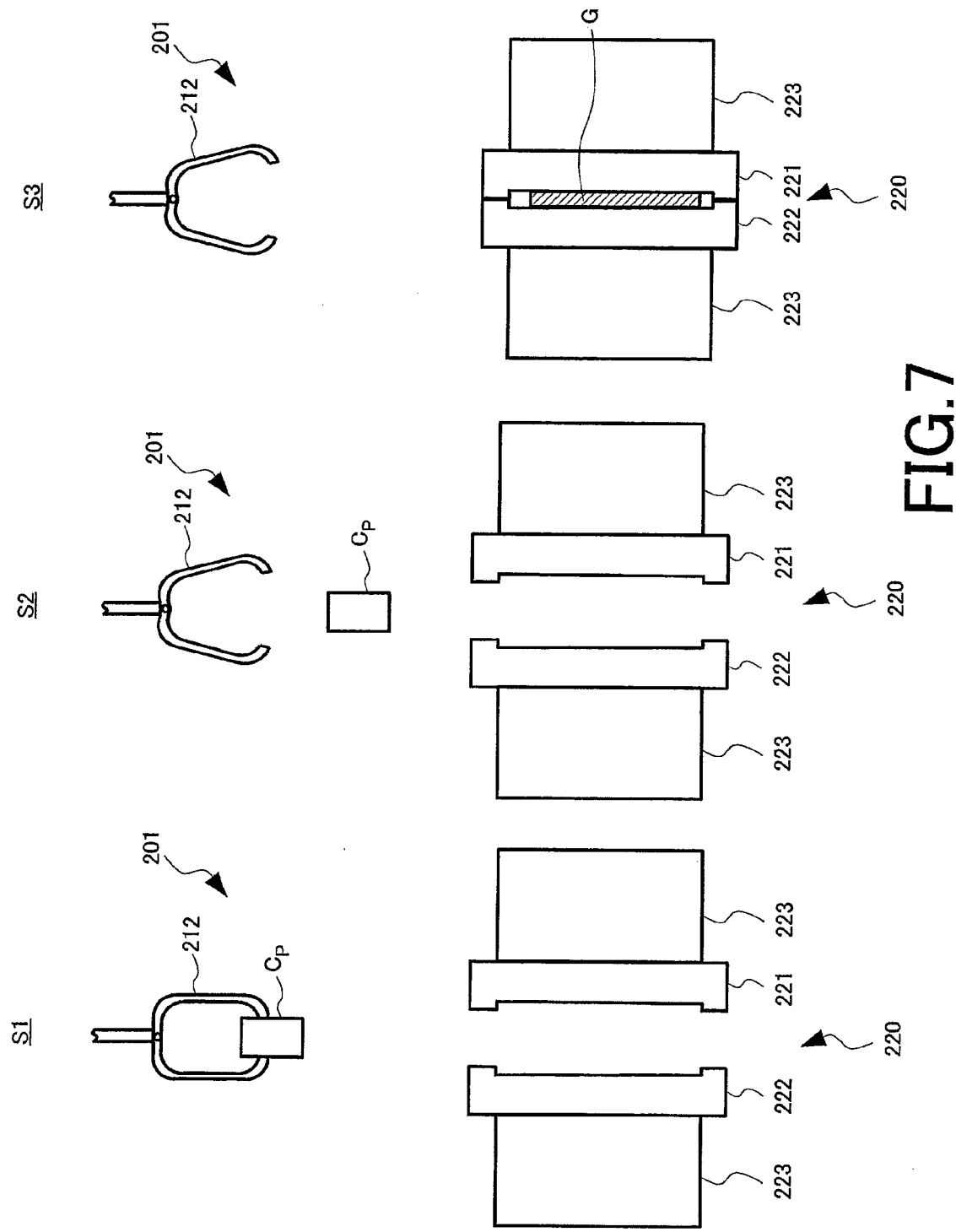
FIG. 7 is a view illustrating a modification of press forming of the embodiment using an optical glass heated by a softening furnace.

S1 to S3 of FIG. 7 are views illustrating another modification in which, instead of the gob $G_G$, a lump $C_P$ of the optical glass heated by a softening furnace (not illustrated) is caused to fall down and the press forming is performed to the lump $C_P$ while the lump $C_P$ is sandwiched from both sides between dies 221 and 222 during the fall of the lump $C_P$. S1 of FIG. 7 is a view illustrating the state before the lump of the heated optical glass is formed. S2 of FIG. 7 is a view illustrating the state in which the lump of the optical glass falls down. S3 of FIG. 7 is a view illustrating the state in which the press forming is performed to the lump of the optical glass to make the glass blank G.

As illustrated in S1 of FIG. 7, in an apparatus 201, a glass material grasping mechanism 212 conveys the lump $C_P$ of the optical glass to a position above a press unit 220. As illustrated in S2 of FIG. 7, the glass material grasping mechanism 212 releases the lump $C_P$ of the optical glass to cause the lump $C_P$ of the optical glass to fall down. As illustrated in S3 of FIG. 7, during the fall of the lump $C_P$ of the optical glass, the lump $C_P$ is sandwiched between the first die 221 and the second die 222 to perform the press forming, thereby preparing the disk-shaped glass blank G. Because the first die 221 and the second die 222 have the same configuration and action as those of the first die 121 and second die 122 illustrated in FIG. 5, the descriptions are omitted.

Figure 8:
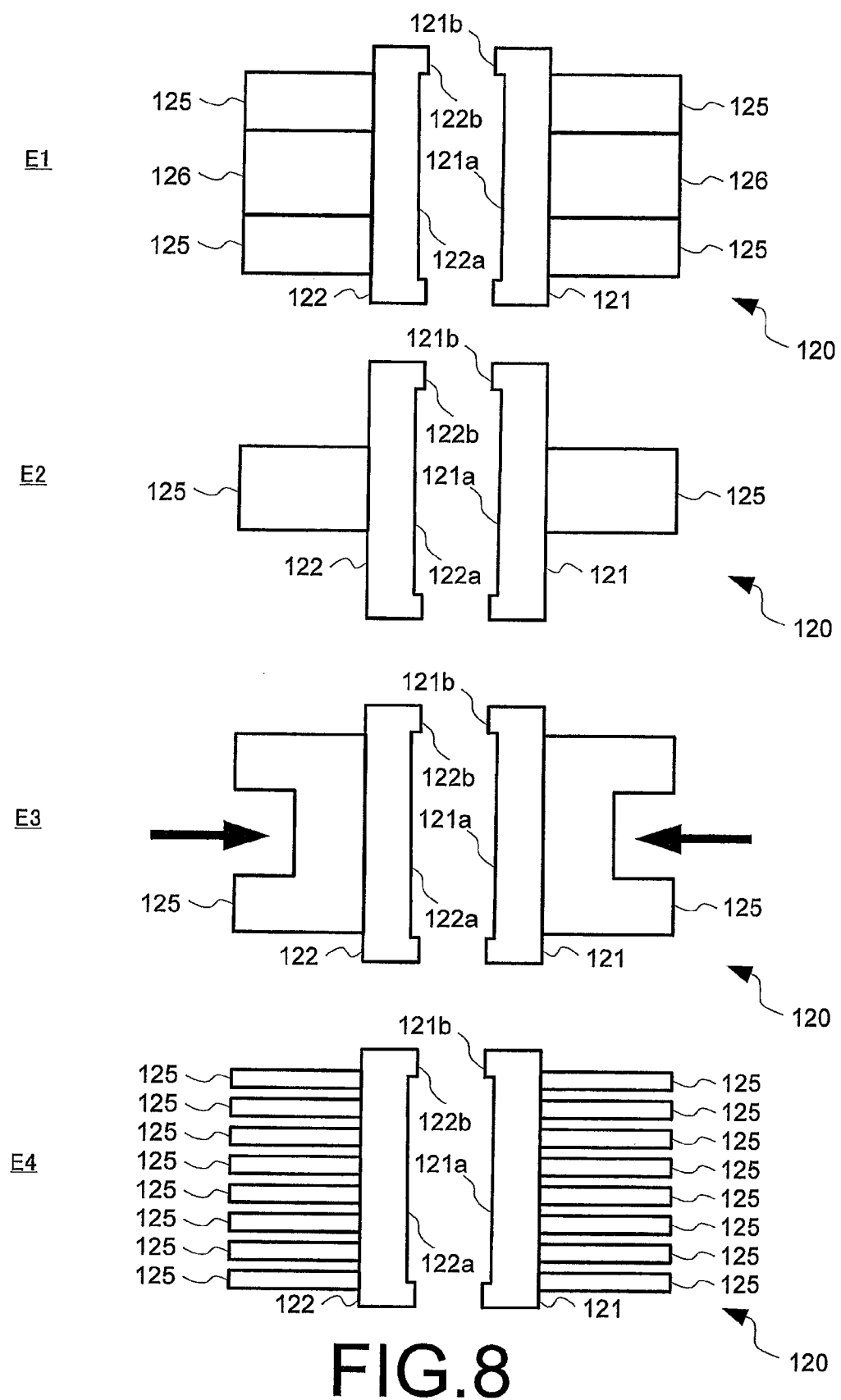
FIG. 8 is a view illustrating a modification of heat exhausting means used in press forming of the embodiment.

E1 to E3 of FIG. 8 are views illustrating a modification of the embodiment of FIG. 4. In this modification, various forms of temperature controlling units 125 are used. E1 of FIG. 8 is a view illustrating a state in which second temperature controlling units 126 having a thermal expansion coefficient higher than that of the cooling control unit 125 is provided between temperature controlling units 125 provided at the circumferential edge portions of surfaces opposite to the inner circumferential surface 121a of the first die 121 and the inner circumferential surface 122a of the second die 122, respectively. E2 of FIG. 8 is a view illustrating a state in which cooling control units 125 are provided only at the central portions of the rear faces of the inner circumferential surface 121a of the first die 121 and the inner circumferential surface 122a of the second die 122. E3 of FIG. 8 is a view illustrating a state in which recessed portions extending toward the central portions of the surfaces opposite to the inner circumferential surface 121a of the first die 121 and the inner circumferential surface 122a of the second die 122 are provided in cooling control units 125.

A case is illustrated in E1 to E3 of FIGS. 8 in which molten glass is generally pressed in the center of each inner circumferential surface 121a, 122a; however, when a location of the molten glass is shifted from the central portion of each inner circumferential surface, locations of the second cooling control unit 126 in E1 of FIG. 8, the cooling control unit 125 in E2 of FIG. 8, and the recessed portions in E3 of FIG. 8 may be adjusted depending on the shift.

As illustrated in E1 of FIG. 8, the second temperature controlling unit 126 is provided at the central portion of each of the rear faces of the circumferential surface 121a of the first die 121 and the inner circumferential surface 122a of the second die 122. Here, for example, when the cooling control unit 125 is made of aluminum or an aluminum alloy, copper, a copper alloy or the like is used as a material of the second cooling control unit 126. By using the second cooling control unit 126, heat confined in the central portions of inner circumferential surfaces 121a and 122a during press forming is discharged to outside through the second cooling control unit 126 having heat conduction efficiency higher than that of the cooling control unit 125. Heat transferred to the circumferential edge portions of inner circumferential surfaces 121a and 122a from the gob $G_G$ is discharged to outside through the cooling control unit 125. In this way, a difference in temperature of the interior of each of inner circumferential surfaces 121a and 122a during press forming can be reduced.

When the cooling control units 125 are provided only at the central portions of the surfaces opposite to inner circumferential surfaces 121a and 122a as illustrated in E2 of FIG. 8, heat confined in the central portions of inner circumferential surfaces 121a and 122a during press forming is discharged to outside through the cooling control unit 125. In this way, a difference in temperature of the interior of each of inner circumferential surfaces 121a and 122a during press forming can be reduced. The second temperature controlling unit 126 may be provided in place of the cooling control unit 125.

Further, when a recessed portion extending toward the central portion of the surface opposite to each of inner circumferential surfaces 121a and 122a is provided in the cooling control unit 125 as illustrated in E3 of FIG. 8, the recessed portion may be cooled using, for example, a liquid, a gas or the like having a cooling effect. In this case, the central portions of inner circumferential surfaces 121a and 122a are rapidly cooled, whereby a difference in temperature of the interior of each of inner circumferential surfaces 121a and 122a during press forming can be reduced. The cooling control unit 125 may be formed so that the central portion of the surface opposite to each of inner circumferential surfaces 121a and 122a can be directly cooled using, for example, a liquid, a gas or the like having a cooling effect.

As illustrated in E4 of FIG. 8, a plurality of temperature controlling units 125 may be provided on the rear face of each of first and second dies 121 and 122. In this case, as compared to the case where one cooling control unit 125 is provided, the contact area of the cooling control unit to outside can be increased, and therefore heat transferred to inner circumferential surfaces 121a and 122a from the gob $G_G$ can be efficiently discharged to outside.

(b) Process of Removing First Compressive Stress Layer (Step S20)

Figure 9:
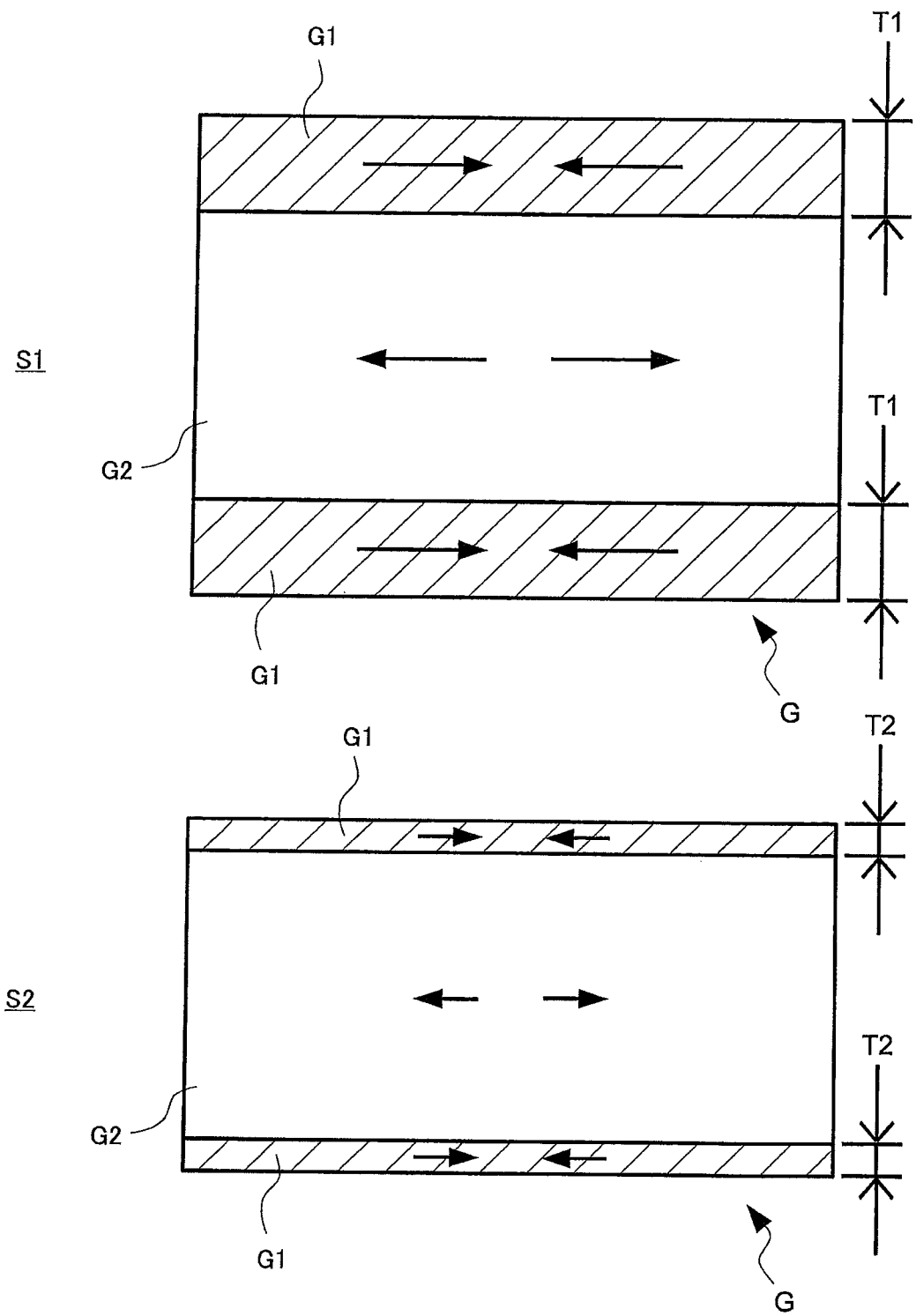
FIG. 9 is a view illustrating the states of stress before and after a process of removing a residual stress layer in the embodiment.

Next, the process of removing a residual stress layer will be described with reference to FIG. 9. S1 of FIG. 9 is a view illustrating a state of the compressive stress layer in the glass blank G before the removing process. S2 of FIG. 9 is a view illustrating a state of stress generated in the glass blank G after the removing process.

When the gob $G_G$ sandwiched between the inner circumferential surface 121a of the first die 121 and the inner circumferential surface 122a of the second die 122 is rapidly cooled in the press forming process, a difference in temperature is generated between the surface portion (both end portions in the thickness direction) and the central portion (central portion in the thickness direction) of the gob $G_G$. At this time, shrinkage of the gob $G_G$ associated with cooling of the gob $G_G$ precedes at the surface portion, and therefore residual stress layers G1 having a thickness T1 are formed on both sides of a pair of principal faces (surfaces on the both end sides in the thickness direction) of the glass blank after the press forming process. On the other hand, in the glass blank G, shrinkage is suppressed by the residual stress layer G1 that has been previously formed. Consequently, a tensile stress layer G2 having a predetermined thickness is formed in the glass blank G. That is, in the glass blank G, a residual stress in the residual stress layer G1 and a tensile stress in the tensile stress layer G2 are generated across the thickness direction of the glass blank G as illustrated by the arrow in the figure. Here, the size of the residual stress generated in the residual stress layer G1 varies depending on the magnitude of the thickness of the residual stress layer G1. That is, the residual stress increases as the thickness of the residual stress layer G1 becomes larger. The tensile stress generated in the tensile stress layer G2 increases as the residual stress increases. The thickness T1 of the residual stress layer G1 formed by the press forming process of this embodiment is 100 μm to 300 μm.

Accordingly, in the process of removing the residual stress layer G1, the principal face of the glass blank G after the press forming process is subjected to grinding processing using a grinding apparatus including a planet gear mechanism. Consequently, at least a part of the residual stress layer G1 is removed to decrease the thickness T1 of the residual stress layer G1, so that the residual stress generated in the residual stress layer G1 can be decreased. The tensile stress generated in the tensile stress layer G2 can also be decreased as the residual stress decreases. Consequently, the internal strain by the stress generated in the glass blank G can be reduced without performing annealing treatment.

For example, the grinding has the machining allowance of several micrometers to about 300 micrometers. The grinding apparatus includes a pair of upper and lower surface plates (upper surface plate and lower surface plate), and a glass substrate is held between the upper surface plate and the lower surface plate. By moving one or both of the upper surface plate and the lower surface plate, the glass blank G and each surface plate are relatively moved, whereby both sides of a pair of principal faces of the glass blank can be ground.

The thickness of the residual stress layer G1 after the removing process is preferably identical between a pair of principal faces. This is because if there is a difference in thickness of the residual stress layer G1 between a pair of principal faces, the glass blank G after the removing process may be warped due to a difference in residual stress between a pair of principal faces. That is, it is preferable that both of the pair of principal faces be machined so that thickness of the residual stress layer G1 of each principal face is the same.

Here, shrinkage of the lump of molten glass associated with cooling precedes at the surface portion. Thus, a value of the residual stress is the largest at the surface of each principal face among those values for the residual stress layers of the press formed glass blank, and the value of the residual stress is smaller to the center in the thickness direction. Therefore, a portion of the residual stress layer may be removed so that the maximum residual stress value of the glass blank is less than a value which causes breaks in the scribing process described later. In other words, a portion of the residual stress layer may be left. The maximum residual stress value which do not cause breaks in the scribing process may be equal to or equal to or less than 0.4 kgf/mm² when measured with Babinet compensation method.

Machining allowance for a single principal face with grinding may be preferably equal to or more than 3% of thickness of the glass blank G, since a superficial portion of the principal face, which has the maximum residual stress, needs to be removed. For example, machining allowance for a single principal face may be preferably equal to or more than 30 μm for 1 mm of thickness of a glass blank. Further, the maximum value of machining allowance with grinding for a single principal face is the same value as thickness of the stress layer (100 to 300 μm). From an aspect for enhancing machining efficiency, the maximum value of machining allowance with grinding for a single principal face may be preferably equal to or less than 10% of thickness of the glass blank G. For example, machining allowance for a single principal face may be preferably equal to or less than 100 μm for 1 mm of thickness of a glass blank.

Further, removal amount (machining allowance) per unit time with grinding for a single principal face may be preferably 3 to 8 μm/min. Preferably, removal amounts (and removal amounts per unit time) of both of a pair of principal faces of a glass blank are the same in order to suppress warp after the grinding.

(c) Scribing Process (Step S30)

Next, the scribing process will be described. After the process of removing the residual stress layer, a donut-shaped glass substrate is formed by subjecting the glass blank G to scribing processing (machining) in the scribing process.

As used herein, the scribing processing means that two concentric (inside concentric and outside concentric) cutting lines (linear scratches or cutting lines) are provided in the surface of the glass blank G with a scriber made of a super alloy or diamond particles in order to obtain the donut-shape (ring-shape) of the formed glass blank G having a predetermined size. It is preferred that two concentric cutting lines are provided at the same time. The glass blank G scribed into two-concentric-circle shape is partially heated, and a portion outside the outside concentric circle and a portion inside the inside concentric circle are removed by a difference in thermal expansion of the glass blank G. In this way, a donut-shaped glass substrate is obtained.

As another example of forming a donut-shaped glass substrate, core drill processing (machining) may be performed using a core drill or the like. A donut-shaped glass substrate can be formed by forming a circular hole and an outer diameter in the glass blank using a core drill or the like.

(d) Shape Processing Process (Step S40)

Next, the shape processing process will be described. The shape processing process includes chamfering processing of the end portion of the glass substrate (chamfering of outer circumferential end portion and inner circumferential end portion) after the scribing process. Chamfering processing is shape processing in which the outer circumferential end portion and inner circumferential end portion of the glass substrate after the scribing process is chamfered between a principal face and a side wall portion perpendicular to the principal face using a diamond abrasive grain. The chamfering angle is, for example, 40 to 50 degrees with respect to the principal face.

(e) Grinding Process Using Fixed Abrasive Grain (Step S50)

In the grinding process using a fixed abrasive grain, the principal face of the glass substrate after the shape processing process is subjected to grinding processing using a grinding apparatus in the same manner as in the removing process of the step S20. For example, the grinding has the machining allowance of several micrometers to about 100 micrometers.

In the press forming process of this embodiment, a glass blank having extremely high flatness can be prepared, and therefore the grinding process may be omitted. Before the grinding process, a lapping process may be performed using a grinding apparatus similar to the apparatus used in the grinding process and an alumina loose abrasive grain.

(f) Edge Polishing Process (Step S60)

Next, edge polishing of the glass substrate after the grinding process is performed.

In edge polishing, the inner circumferential end face and outer circumferential end face of the glass substrate are subjected to mirror surface finishing by brush polishing. At this point, slurry that includes fine particles such as cerium oxide as the loose abrasive grain is used. By performing edge polishing, an impairment such as contamination by deposition of dust or the like, damage or a flaw is eliminated, whereby occurrence of a thermal asperity and deposition of ions of sodium, potassium and the like which may cause corrosion can be prevented.

(g) First Polishing Process (Step S70)

Next, the principal face of the glass substrate after the edge polishing process is subjected to first polishing. For example, first polishing has the machining allowance of several micrometers to about 50 micrometers. First polishing is intended to remove the flaw left on the principal face after the grinding using the fixed abrasive grain, the strain and the micro-surface irregularity (micro-waviness and roughness). In the first polishing process, polishing is performed while a polishing solution is fed using a double polishing apparatus having a structure similar to that of the apparatus used in the grinding process. A polishing agent contained in the polishing solution is, for example, a cerium oxide abrasive grain or a zirconia abrasive grain.

In the first polishing process, polishing is performed so as to have surface roughness (Ra) of 0.5 nm or less and micro-waviness (MV-Rq) of 0.5 nm or less for the principal face of the glass substrate.

The micro-waviness may be represented by a RMS (Rq) value calculated as roughness at a wavelength bandwidth of 100 to 500 µm in a region of 14.0 to 31.5 mm radius in the whole of the principal face, and can be measured using, for example, Model-4224 manufactured by Polytec Inc.

The surface roughness is represented by an arithmetic mean roughness Ra defined in JIS B0601:2001 and, for example, can be measured with roughness measuring machine SV-3100 manufactured by Mitutoyo Corporation and calculated by a method defined in JIS B0633:2001 when the roughness is no less than 0.006 µm and no more than 200 µm. When as a result, the roughness is 0.03 µm or less, for example, the roughness can be measured with a scanning probe microscope (atomic force microscope) nanoscope manufactured by Veeco Instruments Inc. and can be calculated by a method defined in JIS R1683:2007. In the present application, an arithmetic mean roughness Ra as measured in a resolution of 512×512 pixels in a measurement area of 1 µm×1 µm square can be used.

(h) Chemically Strengthening Process (Step S80)

Next, the donut-shaped glass substrate after the first polishing process is chemically strengthened.

For example, a mixed solution of potassium nitrate (60% by weight) and sodium sulfate (40% by weight) can be used as a chemically strengthening solution. In the chemically strengthening process, a chemically strengthening solution is heated to, for example, 300° C. to 400° C., a washed glass substrate is preheated to, for example, 200° C. to 300° C., and the glass substrate is then dipped in the chemically strengthening solution for, for example, 3 to 4 hours.

When the glass substrate is dipped in the chemically strengthening solution, the lithium ion and the sodium ion in the surface layer of the glass substrate are replaced, respectively, by the sodium ion and the potassium ion which have relatively large ion radiuses in the chemically strengthening solution, so that a residual stress layer is formed on the surface layer portion, thereby strengthening the glass substrate. The glass substrate subjected to the chemically strengthening treatment is washed. For example, the glass substrate is washed with sulfuric acid, and then washed with pure water or the like.

(i) Second Polishing Process (Step S90)

Next, the glass substrate after chemically strengthening process is subjected to second polishing. Second polishing may preferably have the machining allowance of about 1 µm, more specifically in the range of 0.5 to 2 µm. When the machining allowance is smaller than that range, surface roughness may not be sufficiently reduced. When the machining allowance is greater than that range, edge shape may be degraded (roll-off, etc.). Second polishing is intended at the mirror surface polishing of the principal face. In second polishing, for example, the polishing apparatus used in first polishing is used. At this point, the second polishing differs from the first polishing in the following points: the kind and particle size of the loose abrasive grain, and hardness of the resin polisher.

For example, the slurry of the turbid fine particles such as colloidal silica (particle size: diameter of about 10 to 50 nm) is used as the loose abrasive grain used in the second polishing.

The polished glass substrate is washed with a neutral detergent, pure water, IPA or the like to obtain a glass substrate for magnetic disk.

It is not necessarily essential to perform the second polishing process, but it is preferable to perform the second polishing process because the level of the surface irregularity of the principal face of the glass substrate can be further improved. By performing the second polishing process, the principal face can be made to have roughness (Ra) of 0.15 nm or less, or more preferably 0.1 nm or less, and a micro-waviness (MW-Rq) of 0.3 nm or less, or more preferably 0.1 nm or less.

As described above, the method for manufacturing a glass blank for magnetic disk in this embodiment includes a press forming process of press-forming a lump of molten glass using a pair of dies. Therefore, when the surface roughness of the inner circumferential surfaces of a pair of dies is set at a good level (e.g. surface roughness required for the glass substrate for magnetic disk), the surface roughness of the glass blank can be kept at a good level because the surface roughness of the inner circumferential surface of the die is duplicated to form the surface roughness of the glass blank. At least a part of the residual stress layer formed on the principal face of the glass blank press-formed in the press forming process may be removed. Therefore, the glass blank obtained in the press forming process of this embodiment does not require a process of machining the principal face because the surface roughness and flatness of the principal face of the glass blank can be kept at a level required for the glass substrate for magnetic disk. The glass substrate shape-processed into a predetermined shape based on the glass blank is subjected to chemically strengthening, but the flatness of the glass substrate is not deteriorated by chemically strengthening in this embodiment. Therefore, the glass substrate for magnetic disk which is finally obtained is thin, and has a high mechanical strength, and flatness higher than was previously possible.

In this embodiment, at least a part of the residual stress layer G1 is removed, so that the residual stress and the tensile stress generated in the glass blank G during press forming can be decreased. Consequently, the internal strain by the stress generated in the glass blank G can be reduced. Accordingly, in this embodiment, a glass substrate for magnetic disk, the internal strain of which is reduced, can be manufactured without performing annealing treatment.

[Magnetic Disk]

The glass substrate for magnetic disk is prepared through the processes described above. A magnetic disk is obtained in the following manner using the above-described glass substrate for magnetic disk.

The magnetic disk has, for example, a configuration in which on the principal face of the glass substrate, at least an adhesive layer, an underlying layer, a magnetic layer (magnetic recording layer), a protective layer and a lubricant layer are stacked in this order from the side closest to the principal face.

For example, the substrate is introduced into an evacuated deposition apparatus, and the adhesive layer, the underlying layer and the magnetic layer are sequentially deposited in an Ar atmosphere by a DC magnetron sputtering method. For example CrTi may be used as the adhesive layer, and for example CrRu may be used as the underlying layer. For example a CoPt-based alloy may be used as the magnetic layer. Also, a CoPt-based alloy or FePt-based alloy having a $L_{10}$ ordered structure may be deposited to form a magnetic layer for heat assisted magnetic recording. After the deposition described above, the protective layer is deposited using $C_2H_4$ by, for example, a CVD method, and subsequently nitriding treatment is performed to introduce nitrogen to the surface, whereby a magnetic recording medium can be formed. Thereafter, the lubricant layer can be formed by applying, for example, PFPE (perfluoropolyether) onto the protective layer by a dip coating method.

EXAMPLES

The present invention will be further described below by way of Examples. However, the present invention is not limited to aspects described in Examples.

(1) Preparation of Molten Glass

Raw materials were weighed so as to obtain a glass having the following composition, and mixed to obtain a mixed raw material. This raw material was put in a melting vessel, heated, melted, clarified and stirred to prepare a homogeneous molten glass free from foam and an unmelted substance. Foam and an unmelted substance, deposition of crystals, and contaminants such as a refractory material and platinum forming the melting vessel were not observed in the glass obtained.

[Composition of Glass]

Amorphous aluminosilicate glass having a composition including 50 to 75% of $SiO_2$, 1 to 15% of $Al_2O_3$, 5 to 35% in total of at least one component selected from $Li_2O$, $Na_2O$ and $K_2O$, 0 to 20% in total of at least one component selected from MgO, CaO, SrO, BaO and ZnO and 0 to 10% in total of at least one component selected from $ZrO_2$, $TiO_2$, $La_2O_3$, $Y_2O_3$, $Ta_2O_5$, $Nb_2O_5$ and $HfO_2$ in an oxide-based conversion indicated in mol %.

The glass was prepared so as to have a glass transition point (Tg) of 630° C. and a strain point of 620° C.

The above-described molten glass was provided, and a glass blank having a diameter of 75 mm and a thickness of 0.9 mm was prepared using a press forming method of the present invention (method using the apparatus in FIGS. 3 and 4). The temperature of a molten glass material $L_G$ discharged from a molten glass outflow port 111 was 1300° C., and the viscosity of the molten glass material $L_G$ at this time was 700 poise. The surface roughness (arithmetic mean roughness Ra) of the inner circumferential surfaces of a first die and a second die was 0.1 µm to 1 µm in the whole surface. Specifically, the surface roughness was adjusted to be 0.1 µm. Further, the first die and the second die were formed of an ultrahard alloy (e.g. VM40) having a thickness of 35 mm. Copper was used as a temperature controlling unit.

The molten glass material $L_G$ discharged from a molten glass outflow port 111 was cut by a cutting unit 160, so that a gob $G_G$ having a thickness of about 20 mm was formed. The gob $G_G$ was pressed under a load of 3000 kgf by a press unit until the gob $G_G$ had a temperature equal to or lower than the strain point of the molten glass material (about 10 seconds), so that a glass blank having a diameter of 75 mm and a thickness of 0.9 mm was formed.

In this Example, the temperature of the first die was set at 470° C., and the temperature of the second die was set at 450 to 490° C. The reason why the minimum temperature of the die was set to 450° C. is that when the minimum temperature of the die is lower than 450° C., the glass may be broken during pressing.

EXAMPLES AND COMPARATIVE EXAMPLES

Comparative Example 1

With regard to Comparative Example 1 illustrated in Table 1, surfaces of principal faces of a glass blank were removed by a predetermined amount, before the glass blank was scribed so as to be an annular glass substrate having an outer diameter of 65 mm, and a central hole diameter of 20 mm. The removal amounts for both surfaces in the principal faces were arranged to be the same each other. Removal amount for a single principal face was 1% of thickness of the glass blank.

Comparative Example 2

With regard to Comparative Example 2 illustrated in Table 1, surfaces of principal faces of a glass blank were removed by a predetermined amount, before the glass blank was scribed so as to be an annular glass substrate having an outer diameter of 65 mm, and a central hole diameter of 20 mm. The removal amounts for both surfaces in the principal faces were arranged to be the same each other. Removal amount for a single principal face was 2% of thickness of the glass blank.

Example 1

With regard to Example 1 illustrated in Table 1, surfaces of principal faces of a glass blank were removed by a predetermined amount, before the glass blank was scribed so as to be an annular glass substrate having an outer diameter of 65 mm, and a central hole diameter of 20 mm. The removal amounts for both surfaces in the principal faces were arranged to be the same each other. Removal amount for a single principal face was 3% of thickness of the glass blank.

Example 2

With regard to Example 1 illustrated in Table 1, surfaces of principal faces of a glass blank were removed by a predetermined amount, before the glass blank was scribed so as to be an annular glass substrate having an outer diameter of 65 mm, and a central hole diameter of 20 mm. The removal amounts for both surfaces in the principal faces were arranged to be the same each other. Removal amount for a single principal face was 4% of thickness of the glass blank.

Example 3

With regard to Example 1 illustrated in Table 1, surfaces of principal faces of a glass blank were removed by a predetermined amount, before the glass blank was scribed so as to be an annular glass substrate having an outer diameter of 65 mm, and a central hole diameter of 20 mm. The removal amounts for both surfaces in the principal faces were arranged to be the same each other. Removal amount for a single principal face was 10% of thickness of the glass blank.

In Comparative Examples 1 to 2 and Examples 1 to 3, the thickness of a residual stress layer formed on each of both sides of the principal face of the glass blank after the press forming process was 100 μm.

[Evaluation of Glass Blank and Glass Substrate Prepared in Example]

First, the maximum residual stress value was measured with Babinet compensation method for each glass blank of Comparative Examples 1 to 2 and Examples 1 to 3. It was observed whether the glass blank broke when scribed. Next, flatness was measured for each manufactured glass substrate having an outer diameter of 65 mm. Next, the glass substrate was subjected to heating treatment intended for an ordering treatment for forming a magnetic layer of a L10-ordered alloy in a medium for a heat-assisted magnetic recording system, and thereafter the flatness and surface roughness (arithmetic mean roughness Ra) of the glass substrate were measured. This heating treatment was performed by keeping the glass blank at 600° C. for 1 minute.

Next, an evaluation for breaks of glass blanks was performed. Specifically, scribing was performed for 100 glass blanks which were manufactured for each of Comparative Examples 1 to 2 and Examples 1 to 3. Then, an evaluation was performed by counting a number of broken glass blanks. Evaluation criteria for breaks of glass blanks illustrated in Table 1 are as follows.
Excellent: Number of broken glass blank was 0 to 1 among the 100 glass blanks.
Good: Number of broken glass blank was 2 to 5 among the 100 glass blanks.
Fair: Number of broken glass blank was 6 to 10 among the 100 glass blanks.
Poor: Number of broken glass blank was equal to or greater than 11 among the 100 glass blanks.

Next, the glass substrate was subjected to heating treatment intended for an ordering treatment for forming a magnetic layer of a L10-ordered alloy in a medium for a heat-assisted magnetic recording system, and thereafter the flatness and surface roughness (arithmetic mean roughness Ra) of the glass substrate were measured. This heating treatment was performed by keeping the glass blank at 600° C. for 1 minute.

The flatness can be defined as a difference between the height of the lowest position (valley) and the highest position (peak) on the principle plane of the glass blank, when the heights are viewed from a fixed height on a normal axis with respect to a horizontal plane on which the glass blank is placed. The flatness was measured using, for example, Flatness Tester FT-900 manufactured by NIDEK CO., LTD. Evaluation criteria for the flatness illustrated in Table 1 are as follows. It is preferred that the flatness of the glass blank is 8.0 μm or less in the following criteria because the flatness can be improved to a level of 4 μm or less, which is target flatness of the glass substrate for magnetic disk. It is preferred that the flatness of the glass blank is 4.0 μm or less because the target flatness of the glass substrate for magnetic disk can be achieved even if the grinding process is omitted, thereby leading to cost reduction.
Good: The flatness is 4.0 μm or less.
Fair: The flatness is more than 4.0 μm and no more than 8.0 μm.
Poor: The flatness is more than 8.0 μm.

The surface roughness is represented by an arithmetic mean roughness Ra defined in JIS B0601:2001 and, for example, can be measured with roughness measuring machine SV-3100 manufactured by Mitutoyo Corporation and calculated by a method defined in JIS B0633:2001 when the roughness is no less than 0.006 μm and no more than 200 μm. When as a result, the roughness is 0.03 μm or less, for example, the roughness can be measured with a scanning probe microscope (atomic force microscope) nanoscope manufactured by Veeco Instruments Inc. and can be calculated by a method defined in JIS R1683:2007. In the present application, an arithmetic mean roughness Ra as measured in a resolution of 256×256 pixels in a measurement area of 10 μm×10 μm square was used. As a result, the surface roughness of the glass blank was 0.5 μm or less in all examples. This is because regardless of the temperature of the die, the inner circumferential surfaces of the first die and the second die are duplicated to form the glass blank, so that the surface roughness of the glass blank is comparable to the surface roughness of the inner circumferential surfaces of the first die and the second die. When the arithmetical mean roughness Ra is 0.1 μm or less, target surface properties of the glass substrate for magnetic disk can be obtained by omitting the grinding process to the principal face and performing the polishing process directly.

TABLE 1

| | Removal amount for a single principal face | Maximum residual stress value | Evaluation of breaks | Evaluation of flatness |
|---|---|---|---|---|
| Comparative Example 1 | 1% | 1 kgf/mm² | Poor | Poor |

TABLE 1-continued

|  | Removal amount for a single principal face | Maximum residual stress value | Evaluation of breaks | Evaluation of flatness |
|---|---|---|---|---|
| Comparative Example 2 | 2% | 0.5 kgf/mm² | Fair | Poor |
| Example 1 | 3% | 0.4 kgf/mm² | Good | Fair |
| Example 2 | 4% | 0.3 kgf/mm² | Good | Fair |
| Example 3 | 10% | 0.1 kgf/mm² | Excellent | Good |

From Table 1, it has become apparent that, by removing at least a part of the residual stress layer formed on the principal face of the press-formed glass blank, breaks of the glass blank are suppressed when formed into a donut shape. This indicates that, since the residual stress layer formed on the principal face of the glass blank is removed, the maximum residual stress value decreases, thereby reducing the internal strain of the glass blank after removal of the residual stress layer. Further, when removal amount for a single principal face was equal to or more than 3% of thickness of the glass blank, glass blanks were obtained for which evaluations of breaks and flatness were good. When removal amount for a single principal face was 3% of thickness of the glass blank, glass blanks were obtained for which evaluations of breaks and flatness were excellent. Flatness before and after the heating treatment were measured for the glass blank of Example 3, and the flatness were both 2.3 µm.

Using glass having the other components (below Composition 2 and 3 of glass), the same experiments were conducted as those for the above-described Examples. Then, it was proved that the same level of results was obtained as described in Examples of Table 1 with regard to flatness.

[Composition 2 of Glass]

Amorphous aluminosilicate glass (Tg: 630° C.; 80×10$^{-7}$/° C. as average linear expansion coefficients of the glass at temperatures of 100° C. to 300° C.) having the following composition.

The glass substrate according to the present embodiment may be amorphous aluminosilicate glass having the following composition.

Glass material including, as a glass composition expressed in mol %, 56 to 75% of $SiO_2$, 1 to 11% of $Al_2O_3$, more than 0% and 4% or less of $Li_2O$, 1% or more and less than 15% of $Na_2O$, and 0% or more and less than 3% of $K_2O$, and is substantially free of BaO;

a total content of alkali metal oxides selected from the group consisting of $Li_2O$, $Na_2O$, and $K_2O$ is in a range of 6 to 15%;

a molar ratio of a content of $Li_2O$ to a content of $Na_2O$ ($Li_2O/Na_2O$) is less than 0.50;

a molar ratio of a content of $K_2O$ to the total content of the alkali metal oxides $\{K_2O/(Li_2O+Na_2O+K_2O)\}$ is 0.13 or less;

a total content of alkaline-earth metal oxides selected from the group consisting of MgO, CaO, and SrO is in a range of 10 to 30%;

a total content of MgO and CaO is in a range of 10 to 30%;

a molar ratio of the total content of MgO and CaO to the total content of the alkaline-earth metal oxides $\{(MgO+CaO)/(MgO+CaO+SrO)\}$ is 0.86 or more;

a total content of the alkali metal oxides and the alkaline-earth metal oxides is in a range of 20 to 40%;

a molar ratio of a total content of MgO, CaO, and $Li_2O$ to the total content of the alkali metal oxides and the alkaline-earth metal oxides $\{(MgO+CaO+Li_2O)/(Li_2O+Na_2O+K_2O+MgO+CaO+SrO)\}$ is 0.50 or more;

a total content of oxides selected from the group consisting of $ZrO_2$, $TiO_2$, $Y_2O_3$, $La_2O_3$, $Gd_2O_3$, $Nb_2O_5$, and $Ta_2O_5$ is more than 0% and 10% or less; and a molar ratio of the total content of the oxides to a content of $Al_2O_3$ $\{(ZrO_2+TiO_2+Y_2O_3+La_2O_3+Gd_2O_3+Nb_2O_5+Ta_2O_5)/Al_2O_3\}$ is 0.40 or more.

[Composition 3 of Glass]

Amorphous aluminosilicate glass (Tg: 680° C.; 80×10$^{-7}$/° C. as average linear expansion coefficients of the glass at temperatures of 100° C. to 300° C.) having the following composition.

Glass material including, as a glass composition expressed in mol %, 50 to 75% of $SiO_2$, 0 to 5% of $Al_2O_3$, 0 to 3% of $Li_2O$, 0 to 5% of ZnO, 3 to 15% in total of $Na_2O$ and $K_2O$, 14 to 35% in total of MgO, CaO, SrO, and BaO and 2 to 9% in total of $ZrO_2$, $TiO_2$, $La_2O_3$, $Y_2O_3$, $Yb_2O_3$, $Ta_2O_5$, $Nb_2O_5$ and $HfO_2$, a molar ratio [(MgO+CaO)/(MgO+CaO+SrO+BaO)] is in a range of 0.8 to 1, and a molar ratio [$Al_2O_3$/(MgO+CaO)] is in a range of 0 to 0.30.

The embodiments of the present invention have been described in detail, but the method for manufacturing a glass substrate for magnetic disk according to the present invention is not limited to the aforementioned embodiments, and it is needless to say that various modifications and changes may be made without departing from the spirit of the present invention.

What is claimed is:

1. A method for manufacturing a glass substrate for a magnetic disk that includes a forming process of forming a plate-shaped glass blank by pressing a lump of molten glass using a pair of dies, the method comprising:

a removing process of removing at least a part of a residual stress layer formed on a pair of principal faces of the glass blank press-formed in the forming process so that the maximum residual stress value is equal to or less than 0.4 kgf/mm²; and a process of forming a donut-shaped glass substrate by subjecting the glass blank after the removing process to machining.

2. The method for manufacturing a glass substrate for a magnetic disk according to claim 1, wherein in the removing process, at least a part of each of the residual stress layers formed on both sides of the pair of principal faces of the glass blank is removed.

3. The method for manufacturing a glass substrate for a magnetic disk according to claim 2, wherein in the removing process, the removal amounts for both surfaces in the principal faces are the same.

4. The method for manufacturing a glass substrate for a magnetic disk according to claim 3, wherein in the removing process, the removal amounts per unit time for both surfaces in the principal faces are the same.

5. The method for manufacturing a glass substrate for a magnetic disk according to claim 1, wherein in the removing process, the removal amount for one of the principal faces is equal to or more than 30 µm.

6. The method for manufacturing a glass substrate for a magnetic disk according to claim 1, wherein in the forming process, a falling lump of molten glass is press-formed using the pair of dies from directions, each direction being orthogonal to the falling direction.

7. The method for manufacturing a glass substrate for a magnetic disk according to claim 1, wherein in the forming process, press forming is performed so that the temperature of the press forming surface of the pair of dies is substantially identical.

8. The method for manufacturing a glass substrate for a magnetic disk according to claim 1, wherein the temperature of the pair of dies is kept lower than the glass transition point (Tg) of the molten glass during a period of time from when the glass blank contacts the pair of dies to the time the glass blank separates from the pair of dies.

9. The method for manufacturing a glass substrate for a magnetic disk according to claim 1, wherein the machining is scribing processing.

10. The method for manufacturing a glass substrate for a magnetic disk according to claim 9, wherein two concentric circles for forming the glass blank into a donut shape are scribed in the glass blank at the same time in the scribing processing.

* * * * *